(12) United States Patent
Kim et al.

(10) Patent No.: US 9,160,848 B2
(45) Date of Patent: Oct. 13, 2015

(54) ELECTRONIC DEVICE AND METHOD OF CONTROLLING THE SAME

(71) Applicant: LG ELECTRONICS INC., Seoul (KR)

(72) Inventors: Taeho Kim, Seoul (KR); Hyungshin Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 20 days.

(21) Appl. No.: 13/708,515

(22) Filed: Dec. 7, 2012

(65) Prior Publication Data

US 2014/0029734 A1    Jan. 30, 2014

(30) Foreign Application Priority Data

Jul. 27, 2012  (KR) .................. 10-2012-0082170

(51) Int. Cl.
*H04M 1/64* (2006.01)
*H04M 3/493* (2006.01)

(52) U.S. Cl.
CPC .............. *H04M 3/4936* (2013.01); *H04M 1/64* (2013.01); *H04M 2201/39* (2013.01); *H04M 2201/40* (2013.01); *H04M 2250/74* (2013.01)

(58) Field of Classification Search
CPC ............ H04M 3/533; H04M 3/42221; H04M 3/5158; H04M 1/65; H04M 3/4876; H04M 2201/40; H04M 3/42059; H04M 1/663; H04M 15/38; H04M 15/00; H04M 3/42017; H04Q 3/00; G07F 17/0014
USPC ............................ 379/67.1–71, 88.01–88.04, 379/88.19–88.23, 118, 120, 127.01, 127.06, 379/207.15, 207.16, 245, 36–51, 379/88.01–88.04; 455/412.1, 412.2, 414.1, 455/415–420, 404.1, 521; 704/208, 214, 704/231, 242, 251
See application file for complete search history.

(56) References Cited

U.S. PATENT DOCUMENTS

| | | | |
|---|---|---|---|
| 6,556,235 B1 * | 4/2003 | Saburi | 348/14.02 |
| 7,333,496 B1 * | 2/2008 | Patel et al. | 370/395.42 |
| 2001/0010714 A1 * | 8/2001 | Nemoto | 379/88.01 |
| 2003/0085990 A1 * | 5/2003 | Saburi | 348/14.02 |
| 2005/0021331 A1 | 1/2005 | Huang et al. | |
| 2006/0217133 A1 * | 9/2006 | Christenson et al. | 455/461 |
| 2008/0015846 A1 * | 1/2008 | Acero et al. | 704/201 |
| 2009/0061832 A1 * | 3/2009 | Goggans et al. | 455/414.1 |
| 2009/0319619 A1 | 12/2009 | Affronti et al. | |
| 2010/0049513 A1 | 2/2010 | Huang et al. | |
| 2010/0330964 A1 * | 12/2010 | Chen et al. | 455/412.1 |
| 2011/0142208 A1 * | 6/2011 | Anderson | 379/88.01 |
| 2013/0040615 A1 * | 2/2013 | Sawhney et al. | 455/414.1 |

FOREIGN PATENT DOCUMENTS

KR   10-2011-0094444 A    8/2011

* cited by examiner

*Primary Examiner* — Akelaw Teshale
(74) *Attorney, Agent, or Firm* — Birch, Stewart, Kolasch & Birch, LLP

(57) ABSTRACT

To achieve the objects of the present invention, according to an aspect of the present invention, an electronic device is provided which includes a communication unit, an output unit, and a controller that connects a call received through the communication unit, performs an automatic conversation operation to conduct an automatic conversation with a calling party, and selectively performs one of a first operation to terminate the call and a second operation to generate recognition information on the automatic conversation and to output the recognition information based on the automatic conversation.

13 Claims, 22 Drawing Sheets

MR. SHIN
HELLO, THIS IS MICHELLE

HELLO, MICHELLE.
THIS IS MR. SHIN'S ASSISTANT, SHARON.
MR. SHIN IS NOT AVAILABLE NOW.

SO HE IS.
IS HE BUSY A LOT?
I HAVE SOMETHING URGENT TO
CONFORM WITH HIM.

WHAT IS IT ABOUT?
MAY I CONFIRM IT INSTEAD?

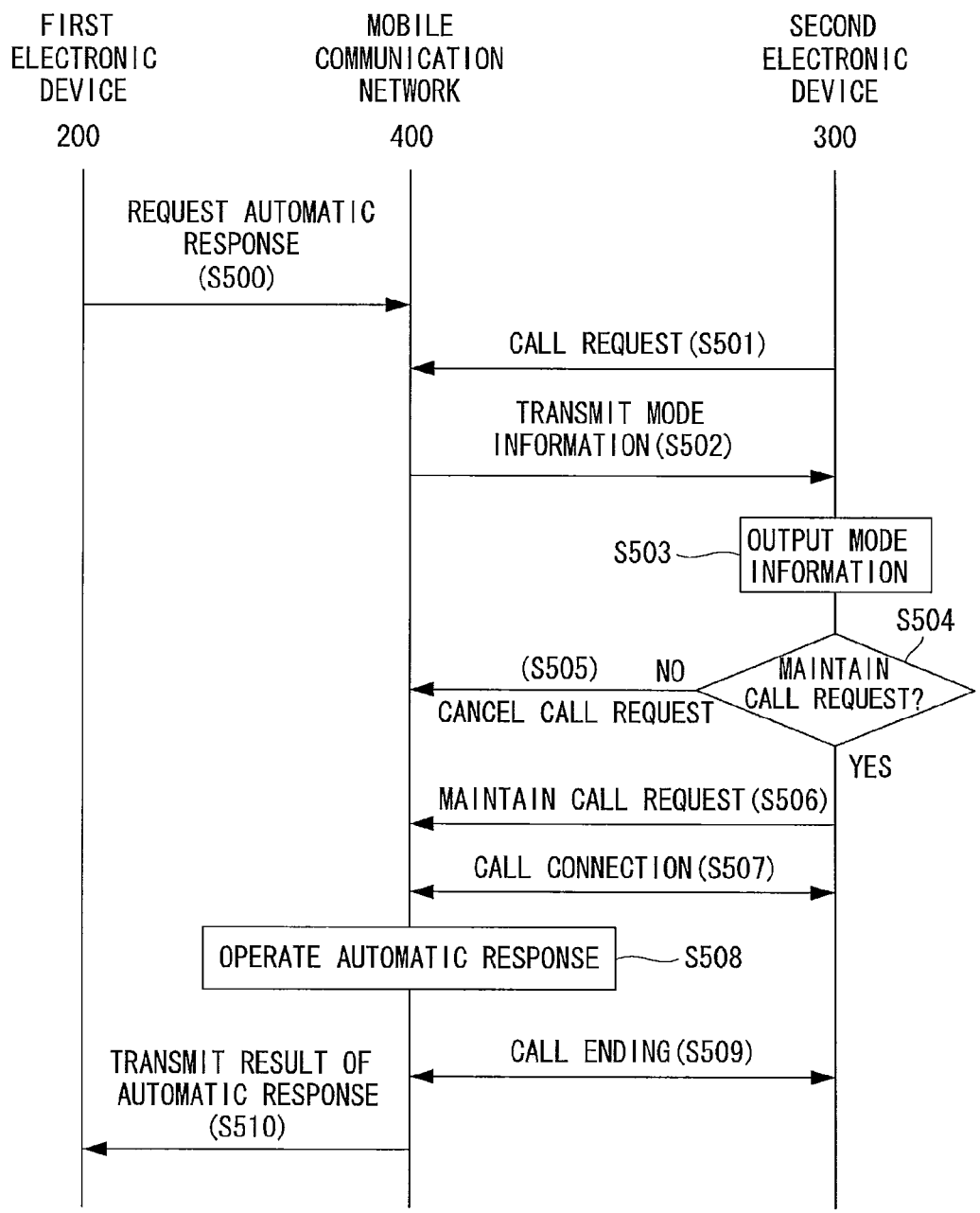

ELECTRONIC DEVICE AND METHOD OF CONTROLLING THE SAME

CROSS-REFERENCE TO RELATED APPLICATION

This application claims priority to Korean Patent Application No. 10-2012-0082170 filed on Jul. 27, 2012, the contents of which are herein incorporated by reference in its entirety.

TECHNICAL FIELD

The present invention relates to a method of controlling an electronic device that communicates with another electronic device, and particularly to a method of controlling an electronic device so that the electronic device may intelligently perform automatic conversation with a called party and/or a messaged party.

DISCUSSION OF THE RELATED ART

As hardware technologies advance, there is a growing environment where artificial intelligence technologies-applied algorithms may be adopted for mobile electronic devices. Accordingly, an ongoing research is on the way to provide services, which respond better to users' demand and their circumstances, to the users through mobile electronic devices.

SUMMARY

An object of the present invention is to provide an electronic device that intelligently performs communication with another electronic device and a method of controlling the electronic device.

Another object of the present invention is to provide a method of controlling a mobile communication network that intelligently performs communication with an electronic device.

To achieve the objects of the present invention, according to an aspect of the present invention, an electronic device is provided. The electronic device may include a communication unit, an output unit, and a controller that connects a call received through the communication unit, performs an automatic conversation operation to conduct an automatic conversation with a calling party, and selectively performs one of a first operation to terminate the call and a second operation to generate recognition information on the automatic conversation and to output the recognition information based on the automatic conversation.

At this time, the automatic conversation operation may include recognizing the calling party's voice received through the communication unit, generating a response voice corresponding to a result of the recognition, and transmitting the response voice through the communication unit.

The controller may verify a set call receiving mode, when the verified call receiving mode is a normal mode, perform a call alert operation to output a call receiving alert image and/or a call receiving alert sound, and when the verified call receiving mode is an automatic mode, perform the automatic conversation operation.

The controller may further receive a first user input on the output recognition information and transmit voice data corresponding to the first user input through the communication unit.

The controller may activate at least one of modules for the call, including a speaker, a microphone, and a camera, when a second user input is entered with respect to the output recognition information.

Meanwhile, the first operation may further include generating a transmission message of the calling party which is generated based on the automatic conversation.

The controller may output the transmission message through the output unit when the call receiving mode switches from the automatic mode to the normal mode.

The controller may determine whether the calling party is urgent based on the automatic conversation, and when the calling party is urgent, perform the second operation. At this time, the controller may determine whether the calling party is urgent based on a result of natural-language processing the automatic conversation. Or, the controller may determine whether the calling party is urgent in consideration of at least one of the calling party's voice and whether a predetermined word and/or phrase is included in the calling party's conversation. The controller may determine whether the calling party is urgent in consideration of at least one of a tone, magnitude, and speed of the calling party's voice.

To achieve the objects of the present invention, according to another aspect of the present invention, an electronic device is provided. The electronic device may include a communication unit, an output unit, and a controller that connects a call received through the communication unit, performs an automatic conversation operation to conduct an automatic conversation with a calling party, when recognizing the calling party's request based on the automatic conversation, determines whether the request is automatically responded based on an accessible domain, and according to a result of the determination, transmits a response to the request to the calling party.

To achieve the objects of the present invention, according to still another aspect of the present invention, an electronic device is provided. The electronic device may include an input unit, a communication unit, an output unit, and a controller that sets a call receiving mode including at least an automatic mode and a normal mode according to at least one of predetermined inputs received through the input unit and a predetermined criterion, transmits information on the set call receiving mode to a first electronic device through the communication unit, and performs an automatic conversation operation to conduct an automatic conversation with a calling party of a call received through the communication unit, wherein the automatic conversation is selectively performed according to the set call receiving mode.

The controller may selectively perform one of a first operation to terminate the call and a second operation to generate recognition information on the automatic conversation and to output the recognition information based on the automatic conversation.

The controller may determine whether the calling party is urgent based on the automatic conversation, and when the calling party is urgent, perform the second operation. At this time, the controller may determine whether the calling party is urgent based on at least one of the calling party's voice and a result of natural-language processing the automatic conversation.

Meanwhile, the call may be requested from a second electronic device through the first electronic device, and the first electronic device may provide the information on the set call receiving mode to the second electronic device when receiving a request of the call from the second electronic device.

At this time, when receiving a request of cancelling the call requested by the second electronic device, the first electronic device may not transmit the call to the electronic device.

The controller may receive an alert message including information on the call cancelling from the first electronic device. At this time, the controller may receive the alert message when the call receiving mode switches to a normal mode.

According to the present invention, the following effects may be achieved.

According to the present invention, the IA performs automatic conversation with the calling party of the call as if the IA is a virtual assistant to the mobile terminal, so that the IA may catch the calling party's purpose of the call in a natural manner.

First, in the case that automatic conversation is implemented by the IA and thus the user cannot directly get the call, the call receiving mode of the mobile terminal may be automatically shifted to the automatic mode, so that the IA may receive the call on behalf. Accordingly, in the circumstances where call receiving is conventionally impossible or difficult, the call is intentionally disregarded, unintentionally missed, or after the circumstance is briefly notified in which it is hard to connect the call to start conversation, the call is terminated, so that any convenience that may happen to the calling party of the call may be mitigated.

Second, in the case that the user failed to switch the receiving mode of the mobile terminal to the automatic mode before a conference begins or before the user attends an important appointment, an event for switching the receiving mode may be generated so that the IA may instead take the call. Thus, the conference and/or the important appointment is not interfered and a more effective response may be made to the call of the calling party.

Third, the user may verify the transmittance message generated by the automatic conversation with the calling party of the call received while the call receiving mode remains set in the automatic mode, and as the user verifies the transmittance message, the user may grasp why the calling party called him and then the user may directly talk to the calling party as necessary, so that the user may more efficiently communicate with the calling party.

Fourth, by previously receiving information on the call receiving mode set in the first electronic device, the user of the second electronic device, who desires to directly talk to the user of the first electronic device but not with the virtual assistant (i.e., IA) provided in the first electronic device, in the case that the is set in the automatic mode, may cancel the call request for the first electronic device in advance. Accordingly, the user of the first electronic device may have an additional effect of saving communication fees that may be inevitably incurred through the call connection to the first electronic device.

Finally, although the IA is not provided in the first electronic device, the same effect as if the IA is installed in the first electronic device may be achieved.

BRIEF DESCRIPTION OF THE DRAWINGS

FIG. 22 is a view illustrating a method of controlling the first electronic device, the mobile communication network, and the second electronic device according to the fifth embodiment of the present invention.

DESCRIPTION OF THE EMBODIMENTS

The present invention will now be described more fully with reference to the accompanying drawings, in which exemplary embodiments of the invention are shown. The invention may, however, be embodied in many different forms and should not be construed as being limited to the embodiments set forth herein; rather, there embodiments are provided so that this disclosure will be thorough and complete, and will fully convey the concept of the invention to those skilled in the art.

Hereinafter, a mobile terminal relating to the present invention will be described below in more detail with reference to the accompanying drawings. In the following description, suffixes "module" and "unit" are given to components of the mobile terminal in consideration of only facilitation of description and do not have meanings or functions discriminated from each other.

The mobile terminal described in the specification can include a cellular phone, a smart phone, a laptop computer, a digital broadcasting terminal, personal digital assistants (PDA), a portable multimedia player (PMP), a navigation system and so on.

Figure 1:
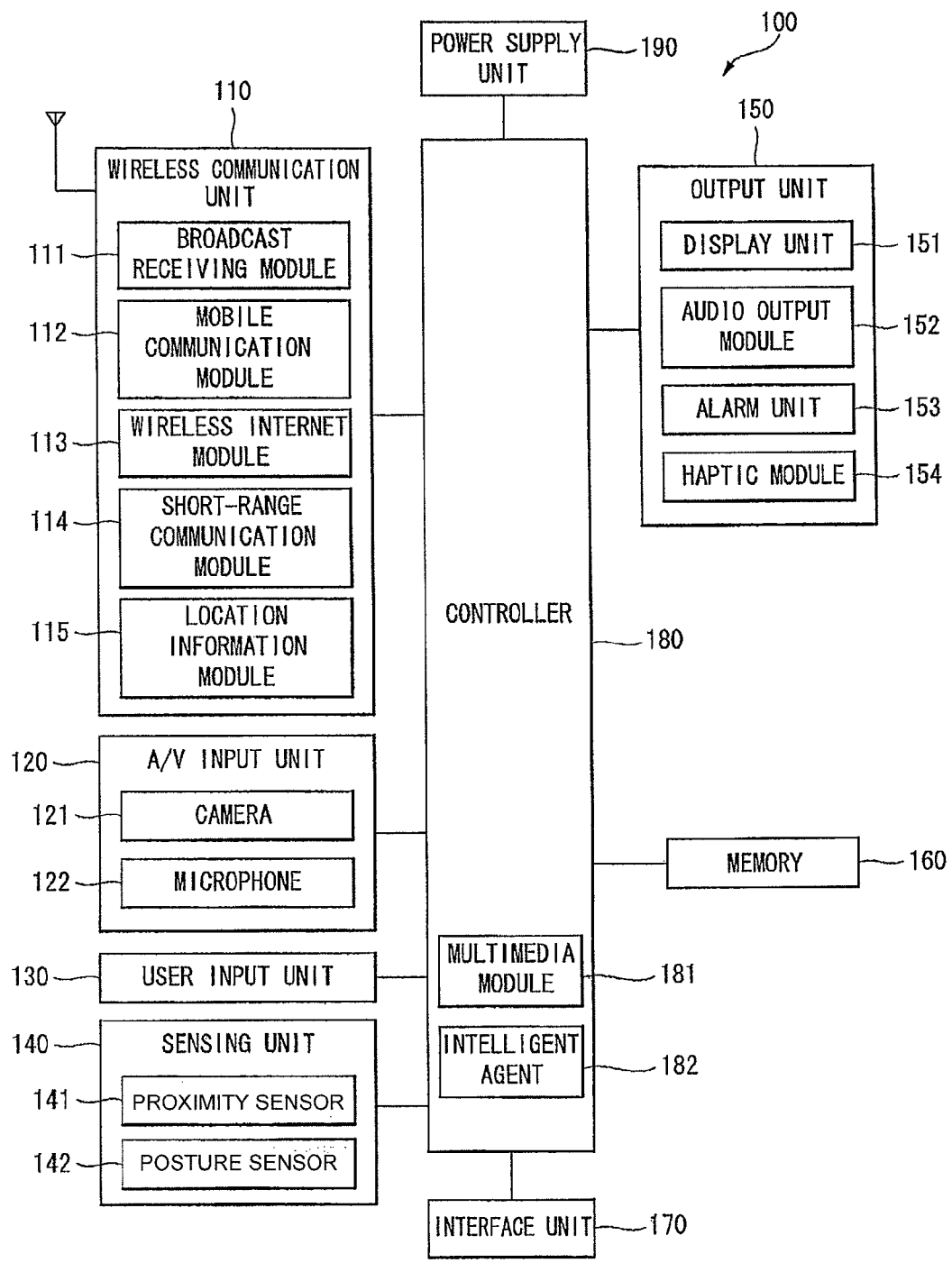
FIG. 1 is a block diagram of a mobile terminal according to an embodiment of the present invention.

FIG. 1 is a block diagram of a mobile terminal 100 according to an embodiment of the present invention. As shown, the mobile terminal 100 includes a wireless communication unit 110, an A/V (Audio/Video) input unit 120, a user input unit 130, a sensing unit 140, an output unit 150, a memory 160, an interface unit 170, a controller 180, and a power supply unit 190, etc. FIG. 1 shows the mobile terminal as having various components, but implementing all of the illustrated components is not a requirement. Greater or fewer components may alternatively be implemented.

In addition, the wireless communication unit 110 generally includes one or more components allowing radio communication between the mobile terminal 100 and a wireless communication system or a network in which the mobile terminal is located. For example, in FIG. 1, the wireless communication unit includes at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server via a broadcast channel. Further, the broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast signal may include a TV broadcast signal, a radio broadcast signal, a data broadcast signal, and the like. Also, the broadcast signal may further include a broadcast signal combined with a TV or radio broadcast signal.

In addition, the broadcast associated information may refer to information associated with a broadcast channel, a broadcast program or a broadcast service provider. The broadcast associated information may also be provided via a mobile communication network and, in this instance, the broadcast associated information may be received by the mobile communication module 112.

Further, the broadcast signal may exist in various forms. For example, the broadcast signal may exist in the form of an electronic program guide (EPG) of the digital multimedia broadcasting (DMB) system, and electronic service guide (ESG) of the digital video broadcast-handheld (DVB-H) system, and the like.

The broadcast receiving module 111 may also be configured to receive signals broadcast by using various types of broadcast systems. In particular, the broadcast receiving module 111 can receive a digital broadcast using a digital broadcast system such as the multimedia broadcasting-terrestrial (DMB-T) system, the digital multimedia broadcasting-satellite (DMB-S) system, the digital video broadcast-handheld (DVB-H) system, the data broadcasting system known as the media forward link only (MediaFLO®), the integrated services digital broadcast-terrestrial (ISDB-T) system, etc.

The broadcast receiving module 111 can also be configured to be suitable for all broadcast systems that provide a broadcast signal as well as the above-mentioned digital broadcast systems. In addition, the broadcast signals and/or broadcast-associated information received via the broadcast receiving module 111 may be stored in the memory 160.

In addition, the mobile communication module 112 transmits and/or receives radio signals to and/or from at least one of a base station, an external terminal and a server. Such radio signals may include a voice call signal, a video call signal or various types of data according to text and/or multimedia message transmission and/or reception.

The wireless Internet module 113 supports wireless Internet access for the mobile terminal and may be internally or externally coupled to the terminal. The wireless Internet access technique implemented may include a WLAN (Wireless LAN) (Wi-Fi), Wibro (Wireless broadband), Wimax (World Interoperability for Microwave Access), HSDPA (High Speed Downlink Packet Access), or the like.

Further, the short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

Also, the location information module 115 is a module for checking or acquiring a location or position of the mobile terminal. The location information module 115 may acquire location information by using a global navigation satellite system (GNSS). Here, the GNSS is a standard generic term for satellite navigation systems revolving around the earth and allowing certain types of radio navigation receivers to transmit reference signals determining their location on or in the vicinity of the surface of the earth. The GNSS may include the United States' global positioning system (GPS), the European Union's Galileo positioning system, the Russian global orbiting navigational satellite system (GLONASS), COMPASS, a compass navigation system, by the People's Republic of China, and the quasi-zenith satellite system (QZSS) by Japan.

An example of GNSS is a GPS (Global Positioning System) module. The GPS module may calculate information related to the distance from one point (entity) to three or more satellites and information related to time at which the distance information was measured, and applies trigonometry to the calculated distance, thereby calculating three-dimensional location information according to latitude, longitude, and altitude with respect to the one point (entity). In addition, a method of acquiring location and time information by using three satellites and correcting an error of the calculated location and time information by using another one satellite may be also used. The GPS module may also continuously calculate the current location in real time and also calculate speed information by using the continuously calculated current location.

With reference to FIG. 1, the A/V input unit 120 is configured to receive an audio or video signal, and includes a camera 121 and a microphone 122. The camera 121 processes image data of still pictures or video obtained by an image capture device in a video capturing mode or an image capturing mode, and the processed image frames can then be displayed on a display unit 151.

Further, the image frames processed by the camera 121 may be stored in the memory 160 or transmitted via the wireless communication unit 110. Two or more cameras 121 may also be provided according to the configuration of the mobile terminal.

In addition, the microphone 122 can receive sounds via a microphone in a phone call mode, a recording mode, a voice recognition mode, and the like, and can process such sounds into audio data. The processed audio data may then be converted for output into a format transmittable to a mobile communication base station via the mobile communication module 112 for the phone call mode. The microphone 122 may also implement various types of noise canceling (or suppression) algorithms to cancel or suppress noise or interference generated when receiving and transmitting audio signals.

Also, the user input unit 130 can generate input data from commands entered by a user to control various operations of the mobile terminal. The user input unit 130 may include a keypad, a dome switch, a touch pad (e.g., a touch sensitive member that detects changes in resistance, pressure, capacitance, etc. due to being contacted), a jog wheel, a jog switch, and the like.

Further, the sensing unit 140 detects a current status of the mobile terminal 100 such as an opened or closed state of the mobile terminal 100, a location of the mobile terminal 100, the presence or absence of user contact with the mobile terminal 100, the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device. In FIG. 1, the sensing unit 140 also includes a proximity sensor 141 and a posture sensor 142 to detect a posture of the mobile terminal 100.

In addition, the output unit 150 is configured to provide outputs in a visual, audible, and/or tactile manner. In the example in FIG. 1, the output unit 150 includes the display unit 151, an audio output module 152, an alarm unit 153, a haptic module 154, and the like. In more detail, the display unit 151 can display information processed in the mobile terminal 100. For example, when the mobile terminal 100 is in a phone call mode, the display unit 151 can display a User Interface (UI) or a Graphic User Interface (GUI) associated with a call or other communication.

The display unit 151 may also include at least one of a Liquid Crystal Display (LCD), a Thin Film Transistor-LCD (TFT-LCD), an Organic Light Emitting Diode (OLED) display, a flexible display, a three-dimensional (3D) display, or the like. Some of these displays may also be configured to be transparent or light-transmissive to allow for viewing of the exterior, which is called transparent displays.

An example transparent display is a TOLED (Transparent Organic Light Emitting Diode) display, or the like. A rear structure of the display unit 151 may be also light-transmissive. Through such configuration, the user can view an object positioned at the rear side of the terminal body through the region occupied by the display unit 151 of the terminal body.

Further, the mobile terminal 100 may include two or more display units according to its particular desired embodiment. For example, a plurality of display units may be separately or integrally disposed on one surface of the mobile terminal, or may be separately disposed on mutually different surfaces.

Meanwhile, when the display unit 151 and a sensor (referred to as a 'touch sensor', hereinafter) for detecting a touch operation are overlaid in a layered manner to form a touch screen, the display unit 151 can function as both an input device and an output device. The touch sensor may have a form of a touch film, a touch sheet, a touch pad, and the like.

Further, the touch sensor may be configured to convert pressure applied to a particular portion of the display unit 151 or a change in the capacitance or the like generated at a particular portion of the display unit 151 into an electrical input signal. The touch sensor may also be configured to detect the pressure when a touch is applied, as well as the touched position and area.

When there is a touch input with respect to the touch sensor, corresponding signals are transmitted to a touch controller, and the touch controller processes the signals and transmits corresponding data to the controller 180. Accordingly, the controller 180 can recognize which portion of the display unit 151 has been touched.

With reference to FIG. 1, the proximity sensor 141 may be disposed within or near the touch screen. in more detail, the proximity sensor 141 is a sensor for detecting the presence or absence of an object relative to a certain detection surface or an object that exists nearby by using the force of electromagnetism or infrared rays without a physical contact. Thus, the proximity sensor 141 has a considerably longer life span compared with a contact type sensor, and can be utilized for various purposes.

Examples of the proximity sensor 141 include a transmission type photoelectric sensor, a direct reflection type photoelectric sensor, a mirror-reflection type photo sensor, an RF oscillation type proximity sensor, a capacitance type proximity sensor, a magnetic proximity sensor, an infrared proximity sensor, and the like. When the touch screen is the capacitance type, proximity of the pointer is detected by a change in electric field according to the proximity of the pointer. In this instance, the touch screen (touch sensor) may be classified as a proximity sensor.

In the following description, for the sake of brevity, recognition of the pointer positioned to be close to the touch screen will be called a 'proximity touch', while recognition of actual contacting of the pointer on the touch screen will be called a 'contact touch'. Further, when the pointer is in the state of the proximity touch, it means that the pointer is positioned to correspond vertically to the touch screen.

By employing the proximity sensor 141, a proximity touch and a proximity touch pattern (e.g., a proximity touch distance, a proximity touch speed, a proximity touch time, a proximity touch position, a proximity touch movement state, or the like) can be detected, and information corresponding to the detected proximity touch operation and the proximity touch pattern can be output to the touch screen.

Further, the audio output module 152 can convert and output as sound audio data received from the wireless communication unit 110 or stored in the memory 160 in a call signal reception mode, a call mode, a record mode, a voice recognition mode, a broadcast reception mode, and the like. Also, the audio output module 152 can provide audible outputs related to a particular function performed by the mobile terminal 100 (e.g., a call signal reception sound, a message reception sound, etc.). The audio output module 152 may also include a speaker, a buzzer, or the like. In addition, the audio output module 152 may output a sound through an earphone jack.

In addition, the alarm unit 153 can output information about the occurrence of an event of the mobile terminal 100. Typical events include call reception, message reception, key signal inputs, a touch input etc. In addition to audio or video outputs, the alarm unit 153 can provide outputs in a different manner to inform about the occurrence of an event. For example, the alarm unit 153 can provide an output in the form of vibrations. The video signal or the audio signal may be also output through the display unit 151 or the audio output module 152.

In addition, the haptic module 154 generates various tactile effects the user may feel. One example of the tactile effects generated by the haptic module 154 is vibration. The strength and pattern of the haptic module 154 can also be controlled. For example, different vibrations may be combined to be output or sequentially output.

Besides vibration, the haptic module 154 can generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 154 may also be implemented to allow the user to feel a tactile effect through a muscle sensation such as fingers or arm of the user, as well as transferring the tactile effect through a direct contact. Two or more haptic modules 154 may be provided according to the configuration of the mobile terminal 100.

Further, the memory 160 can store software programs used for the processing and controlling operations performed by the controller 180, or temporarily store data (e.g., a phonebook, messages, still images, video, etc.) that are input or output. In addition, the memory 160 may store data regarding various patterns of vibrations and audio signals output when a touch is input to the touch screen.

The memory 160 may also include at least one type of storage medium including a flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

Also, the interface unit 170 serves as an interface with external devices connected with the mobile terminal 100. For example, the external devices can transmit data to an external device, receive and transmit power to each element of the mobile terminal 100, or transmit internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

The identification module may also be a chip that stores various types of information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device can be connected with the mobile terminal 100 via a port.

When the mobile terminal 100 is connected with an external cradle, the interface unit 170 can also serve as a passage to allow power from the cradle to be supplied therethrough to the mobile terminal 100 or serve as a passage to allow various command signals input by the user from the cradle to be transferred to the mobile terminal therethrough. Various command signals or power input from the cradle may operate as signals for recognizing that the mobile terminal is properly mounted on the cradle.

In addition, the controller 180 controls the general operations of the mobile terminal. For example, the controller 180 performs controlling and processing associated with voice calls, data communications, video calls, and the like. In the example in FIG. 1, the controller 180 also includes a multimedia module 181 for reproducing multimedia data. The multimedia module 181 may be configured within the controller 180 or may be configured to be separated from the controller 180.

Meanwhile, the controller 180 may include an intelligent agent 182. The intelligent agent 182 may actively interact with another outside electronic device or a user of the mobile terminal 100. For example, the intelligent agent 182 may actively respond to a request of another electronic device without receiving a special command from the user of the mobile terminal 100. As another example, the intelligent agent 182 may recognize various types of inputs (e.g., a touch input, a key input, a voice input, a motion input, a gesture input, etc.) from the user and may actively respond to the user's input.

The intelligent agent 182 may recognize the user's routine, natural motion, conversation, gesture, or message input, as well as an input that matches a predetermined specific pattern, and accordingly, the intelligent agent 182 may output a response that may interact with the user's natural motion, conversation, and gesture. The response may be output auditorily, visually, or tactily. The type of output of the response is not necessarily limited thereto and may be properly selected considering the user's input type. For example, in the case that the intelligent agent 182 responds to the user's natural conversation, the response may be auditorily output, and in the case that the intelligent agent 182 responds to the user's message input, the response may be visually output.

The functions of the intelligent agent 182 are not limited to those described above and will be described in detail later.

Although it is described that the intelligent agent 182 is configured as a lower-level constitutional element of the controller 180, the intelligent agent 182 is not necessarily configured as a lower-level constitutional element of the controller 180, and may be implemented as a separate module.

The controller 180 can also perform a pattern recognition processing to recognize a handwriting input or a picture drawing input performed on the touch screen as characters or images, respectively.

Also, the power supply unit 190 receives external power or internal power and supplies appropriate power required for operating respective elements and components under the control of the controller 180. Further, various embodiments described herein may be implemented in a computer-readable or its similar medium using, for example, software, hardware, or any combination thereof.

For a hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For a software implementation, the embodiments such as procedures or functions described herein may be implemented by separate software modules. Each software module may perform one or more functions or operations described herein. Software codes can be implemented by a software application written in any suitable programming language. The software codes may be stored in the memory 160 and executed by the controller 180.

According to the present invention, there is disclosed the mobile terminal 100 that may be utilized by a user in a more convenient and easier way by using the intelligent agent 182. The intelligent agent 182 may be implemented in hardware or software. Further, the intelligent agent 182 may be also referred to as an IA (Intelligent Agent) as necessary. Hereinafter, various methods of operating the mobile terminal 100 using the intelligent agent 182 according to the present invention will be described in greater detail.

Figure 2:
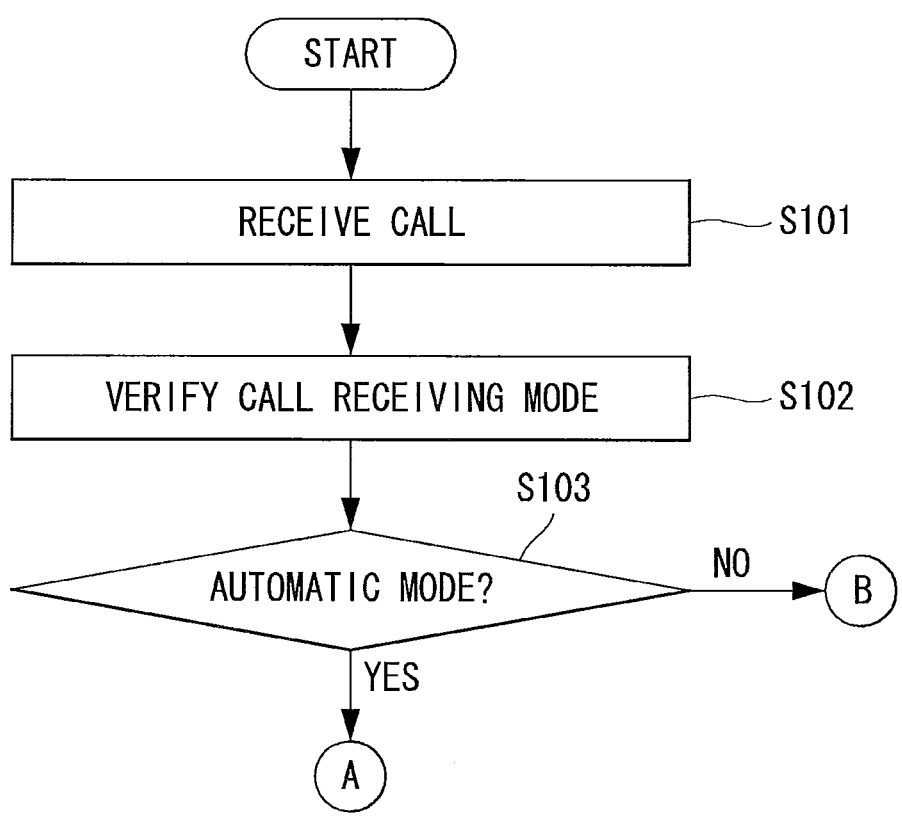
FIG. 2 is a flowchart illustrating a method of operating an electronic device when a call is received according to some embodiments of the present invention.

FIG. 2 is a flowchart illustrating a method of operating an electronic device when a call is received according to some embodiments of the present invention.

Referring to FIG. 2, when a call is received by the mobile terminal 100 (S101), the mobile terminal 100 may verify a call receiving mode that is currently set in the mobile terminal 100 (S102). Step S102 may be performed by the controller 180 or the IA 182.

According to the present invention, the call receiving mode of the mobile terminal 100 includes an automatic mode and a normal mode. In describing the present invention, for convenience of description, the mobile terminal 100 is assumed to be set in either the automatic mode or the normal mode. However, the call receiving mode of the mobile terminal 100 may include any other modes than the two modes. The call receiving mode of the mobile terminal 100 may be set by various methods, which will be described in detail later.

Subsequently, the mobile terminal 100 may determine whether a current mode is the automatic mode (S103), and in the case that the call receiving mode of the electronic device is set in the automatic mode, the mobile terminal 100 may perform step S104 illustrated in FIG. 3, and in the case that the call receiving mode of the electronic device is set in the normal mode (i.e, unless the call receiving mode of the electronic device is set in the normal mode), the mobile terminal 100 may perform step S112 illustrated in FIG. 4.

According to a first embodiment of the present invention, in the case that the call receiving mode is set in the automatic mode, the mobile terminal 100 may perform conversation with a called party by connecting a call instead of a user, and as necessary, may pass the connected call over to the user so that the user may have a talk on his own through the connected call, or may terminate the connected call after verifying necessary items. Hereinafter, the first embodiment of the present invention is described referring to FIGS. 3 to 12.

Figure 3:
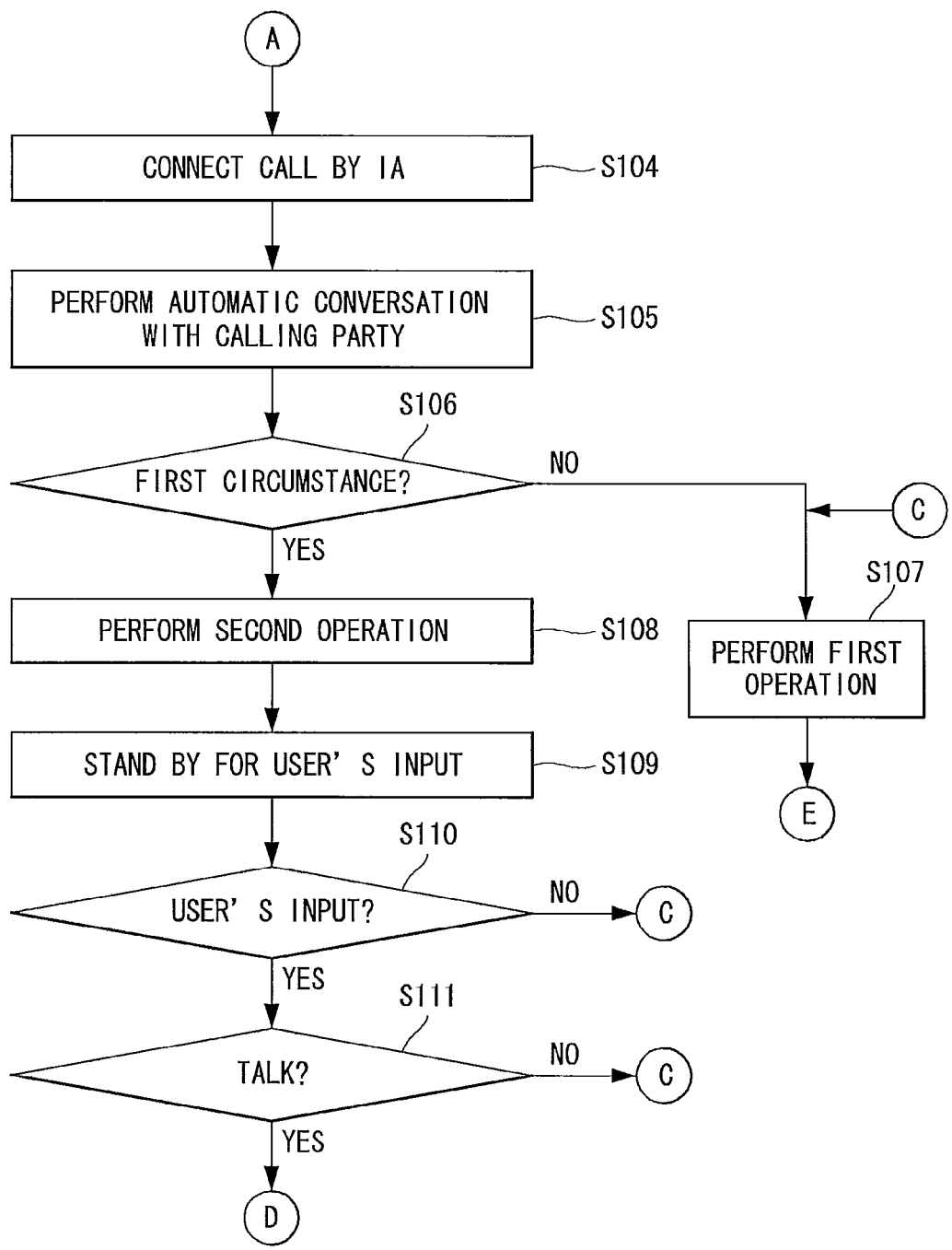
FIG. 3 is a view illustrating a method of responding to a received call by automatic connection in the case that the electronic device is set in the automatic mode according to the first embodiment of the present invention.

FIG. 3 is a view illustrating a method of responding to a received call by automatic connection in the case that the electronic device is set in the automatic mode according to the first embodiment of the present invention.

Referring to FIG. 3, the IA 182 may connect to a received call (S104). Accordingly, a connection may be made to a calling party (an electronic device that requested the call). That is, in the case that the call receiving mode of the mobile terminal 100 is set in the automatic mode, although the user of the mobile terminal 100 does not make a separate input (e.g., a button input, touch input, specific gesture input, or voice command for call connection) in response to the call receipt, the IA 182 receives the call on its own.

Further, in the case that, upon call receipt, the call receiving mode is set in the automatic mode, the mobile terminal 100 may not perform an operation of alerting the user to the call being received. For example, although the conventional mobile phones or smart phones are designed to, upon call receipt, alert the user to call receiving by outputting a bell sound, displaying a call receiving image on the display module 151, or by vibrating, so that the user may perform a predetermined input for call connection, the mobile terminal 100 according to the present invention, when set in the automatic mode, may actively respond to the call receipt instead of the user, and thus, does not need to perform the operation of alerting the user to call receiving.

However, as described above, the phrase "does not need to perform the operation of alerting the user to call receiving" merely means no need of very actively outputting a bell sound, displaying a call receiving image, or vibrating for the user to recognize well the call receipt and does not exclude alerting the user to the call receipt through the operations, such as displaying a predetermined indicator on a portion of the display module 151 to passively alert the user to the call receipt or the automatic talk being conducted by the IA 182 as will be described later while the call receiving mode is currently set in the automatic mode.

Further, in the case that the call receiving mode is set in the automatic mode when the call is received, the mobile terminal 100 does not need to activate the speaker (i.e., the audio output module 152) to output a voice of the calling party, the microphone 122 to receive the user's voice to be transferred to the calling party, and the camera 121 to capture the user's image to be transferred to the calling party or does not need to display an image to output the calling party's image on the display module 151.

That is, the mobile phones or smart phones, which have been so far known, enable a voice call between the user and the calling party by activating the audio output module 152 and the microphone 122 to talk to the calling party when the call is received, or in the case that a call is connected for video call, display the calling part's image on the display module 151, activating the camera 121 to capture the user's image. However, the mobile terminal 100 according to the present invention may actively respond to the call receipt instead of the user, thus eliminating the need of performing the above-described operations to start a talk between the user and the calling party of the call.

Of course, "not activating the audio output module 152, the microphone 122, and the camera 121" as described above merely means that it is not needed to activate the modules by using a call receiving and/or call connecting event as a trigger, and in the case that the modules stay activated for other purposes (for example, the microphone 122 activated for recording a conference) while set in the automatic mode, when a call is received, it is not required to inactivate the modules that have been already activated.

After connecting the call on its own, the IA 182 may perform an automatic conversation with the calling party of the connected call (S105).

The IA 182 may recognize the calling party's voice, generate a sentence and/or phrase appropriate for the calling party's words (for example, the calling party's sentence and/or phrase received via the connected call) on its own according to the recognized result, and transfer the generated sentence and/or phrase to the calling party of the call (that is, the electronic device used by the calling party). At this time, the generated sentence and/or phrase generated by the IA 182 need not be auditorily output from the mobile terminal 100. The sentence and/or phrase may be properly encoded and the encoded result may be transferred to be auditorily output to the calling party of the call. By doing so, the calling party of the call may listen to the response (i.e., the sentence and/or phrase) generated by the IA 182.

In response to the response transferred from the IA 182, the calling party of the call may transfer another sentence and/or phrase to the mobile terminal 100, as described above, and in response, the IA 182 may repetitively perform the above-described scheme to properly respond to the calling party.

On the other hand, in the case that a call requested by the calling party is a video call, the IA 182 may decline video transmission or may transfer a replacement image. The replacement image may be an image (e.g., avatar image) visualized to correspond to the IA 182, and may be an image preset by the user.

That is, when set in the automatic receiving mode, the IA 182 may naturally perform conversation with the calling party of the call.

To perform such automatic conversation, a voice recognizing technology may apply to the IA 182, and a natural language processing technology may also apply to the IA 182 to recognize the calling party's words and grasp the meaning.

Figure 6:
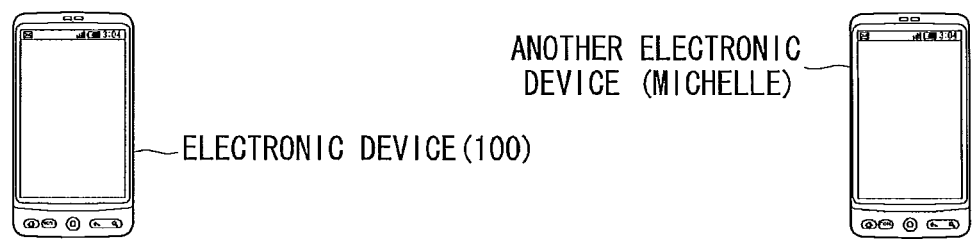
FIG. 6 is a view visually illustrating an example where automatic conversation is performed by an IA according to an embodiment of the present invention.

FIG. 6 is a view visually illustrating an example where automatic conversation is performed by an IA according to an embodiment of the present invention.

Referring to FIG. 6, it can be seen that the IA 182 naturally responds to the calling party, "Michelle", and further the IA 182 catches the meaning of words spoken by Michelle and properly responds to her. Further, the IA 182 transfers the current circumstance of the user to the calling party (Michelle) to thereby mitigate inconvenience that may be caused when Michelle cannot talk to Mr. Shin who Michelle originally intended to.

As such, the IA 182 performs automatic conversation with the calling party of the call as if the IA 182 is a virtual assistant to the mobile terminal 100, so that the IA 182 may catch the calling party's purpose of the call in a natural manner. In the case that automatic conversation is implemented by the IA 182 and thus the user cannot directly get the call, the call receiving mode of the mobile terminal 100 may be automatically shifted to the automatic mode, so that the IA 182 may receive the call on behalf. Accordingly, in the circumstances where call receiving is conventionally impossible or difficult, the call is intentionally disregarded, unintentionally missed, or after the circumstance is briefly notified in which it is hard to connect the call to start conversation, the call is terminated, so that any convenience that may happen to the calling party of the call may be mitigated.

In step S105, the IA 182 may perform automatic conversation and may determine whether the current circumstance is a first circumstance based on the automatic conversation (S106). The first circumstance may include, at least, an emergency circumstance. That is, the IA 182 may determine whether the calling party needs to directly talk to the user while performing the automatic conversation with the calling party. To determine whether the current circumstance is the emergency circumstance, the IA 182 may use various schemes.

Figure 7:
FIG. 7 is a view illustrating a method of determining whether the current circumstance is the first circumstance according to an embodiment of the present invention.

First, the IA 182 may grasp the meaning of a sentence and/or phrase recognized by performing natural language processing on a sentence and/or phrase from the calling party and may determine whether the calling party currently desires to directly talk to the user according to the grasped meaning. For example, the IA 182 may determine whether the current circumstance is an emergency circumstance by exactly explaining the circumstance where the user cannot directly receive the call to the calling user and then inquiring whether the call, nonetheless, needs to be directly connected to the user. Or, to determine whether the current circumstance is an emergency circumstance, the IA 182 may determine whether there are predefined words and/or phrases in the calling party's conversation. FIG. 7 is a view illustrating a method of determining whether the current circumstance is the first circumstance according to an embodiment of the present invention. FIG. 7 illustrates an example where the automatic conversation with the IA is continued from the automatic conversation illustrated in FIG. 6. Referring to FIG. 7, the calling party, Michelle, desires to directly talk to the user, Mr. Shin, and accordingly, the IA 182 responds by saying that the IA 182 connects the call to Mr. Shin right away. Connecting the call to the user will be described later.

Second, the IA 182 may analyze the calling party's voice to thereby determine whether the current circumstance is an urgent circumstance. For example, when the calling party's voice is sharp, the IA 182 may determine that the current circumstance is urgent. For this, the IA 182 may hold sampled voices of people stored in a phone book of the mobile terminal 100 and may compare the calling party's voice with a sampled voice to determine whether the calling party's voice is high and sharp.

Figure 8:
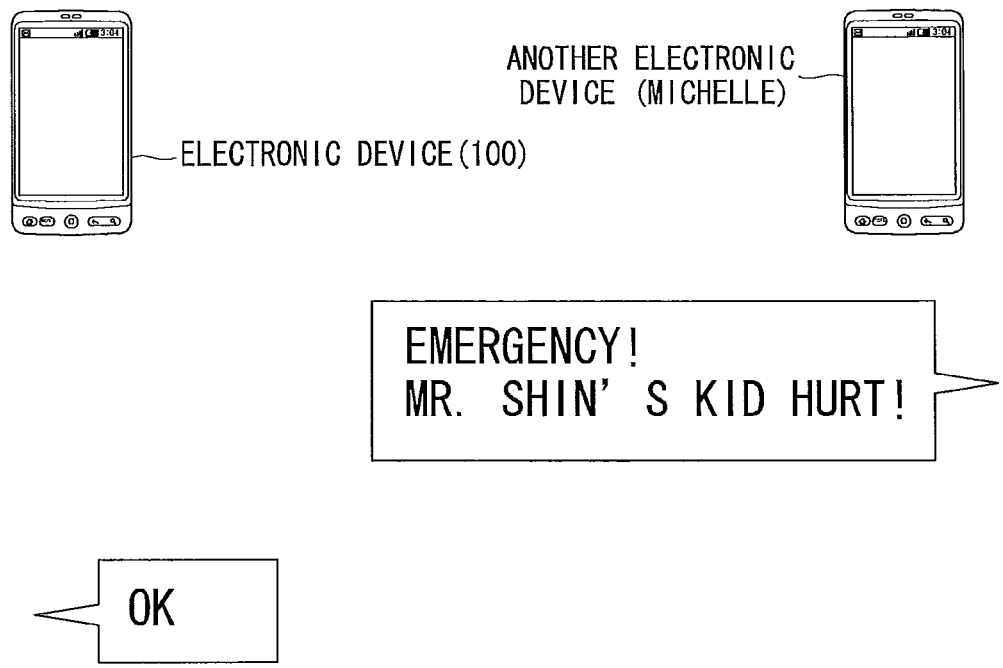
FIG. 8 is a view illustrating a method of determining whether the current circumstance is the first circumstance according to an embodiment of the present invention.

However, sampling the voices of people stored in the phone book are not necessarily performed by the mobile terminal 100 nor are the sampled voices stored in the memory 160 of the mobile terminal 100. Sampling and/or storing the sampled voices may be performed by another electronic device, such as a server. Or, a reference value for a unique voice characteristic included in a voice that comes out in an emergency circumstance may be set, and the reference value may be compared with a result of analysis of the calling party's voice to thereby determine whether the current circumstance is the emergency circumstance. That is, in general, when left in an emergency circumstance, the voice tone and volume of the calling party increase. Reference values on the voice tone and/or volume may be previously set and then may be compared with the calling party's voice, so that the above-described determination may be conducted. FIG. 8 is a view illustrating a method of determining whether the current circumstance is the first circumstance according to an embodiment of the present invention, wherein the automatic conversation between the IA and the calling party illustrated in FIG. 8 may be continued from the automatic conversation illustrated in FIG. 6. Referring to FIG. 8, it can be seen that the calling party, Michelle, has a higher voice volume, and the IA 182 may determine that the current circumstance is an emergency circumstance by determining that Michelle's voice volume is larger than a reference value. Further, to determine whether the current circumstance is an emergency circumstance, the calling party's voice speed may be additionally or independently considered as well.

Third, the IA 182 may previously assign the degree of the calling party's emergency to a predetermined level by a predetermined method (e.g., either or both the above-described first or/and second method), compares the defined level with a user set level previously received from the user, and determine that the current circumstance is an emergency circumstance only if the determined level of the calling party's is higher than the user set level. More specifically, upon setting into the automatic mode, the user may set the level to fit his circumstance. For example, when currently attending an important circumstance, the user may set the level for the automatic mode into level 1, when attending a free-style meeting, the user sets to level 2, when desiring to refrain from others' interference, the user sets to level 3, and when merely in execution of an application (e.g., watching video or playing games), the user sets to level 4. At this time, the IA 182 may assign the degree of the calling party's emergency into a proper level, so that when the currently determined degree of the calling party's emergency is level 2, and the level 3 is currently set to the mobile terminal 100, it may be determined as an emergency circumstance, but when level 1 is currently set to the mobile terminal 100, it may be not determined as an emergency circumstance.

The IA 182 determines, according to the above-described method, whether the current circumstance is the first circumstance (e.g. emergency circumstance), and in the case that the current circumstance is the first circumstance (e.g., emergency circumstance), the IA 182 performs step S108. In the case that the current circumstance is not the first circumstance, the IA 182 performs step S107.

Hereinafter, subsequent operations of the mobile terminal 100 when the current circumstance is determined as the first circumstance are described, and subsequent operations of the mobile terminal 100 when the current circumstance is not determined as the first circumstance are then described.

In the case that the current circumstance is the first circumstance, the IA 182 may perform a second operation (S108). The second operation basically includes operations that are performed to allow the user to directly respond to the connected call, and may include various operations. Hereinafter, the second operation is described in greater detail.

First, the IA 182 may output an alarm that requests a user to directly respond to a call.

For example, upon call receipt, the IA 182 may output a bell sound, vibration, or an image requesting a call response.

At this time, based on the automatic conversation executed in step S105, the IA 182 may summarize why the calling party is calling and may output the summarized result in a visual and/or auditory manner so that the user may recognize it. For example, in the case that there was an automatic conversation as illustrated in FIG. 7, the IA 182 may visually display on the display unit 151 a brief note saying "tomorrow's meeting-related". Of course, the IA 182 may auditorily output the same content through the audio output module 152.

Figure 9:
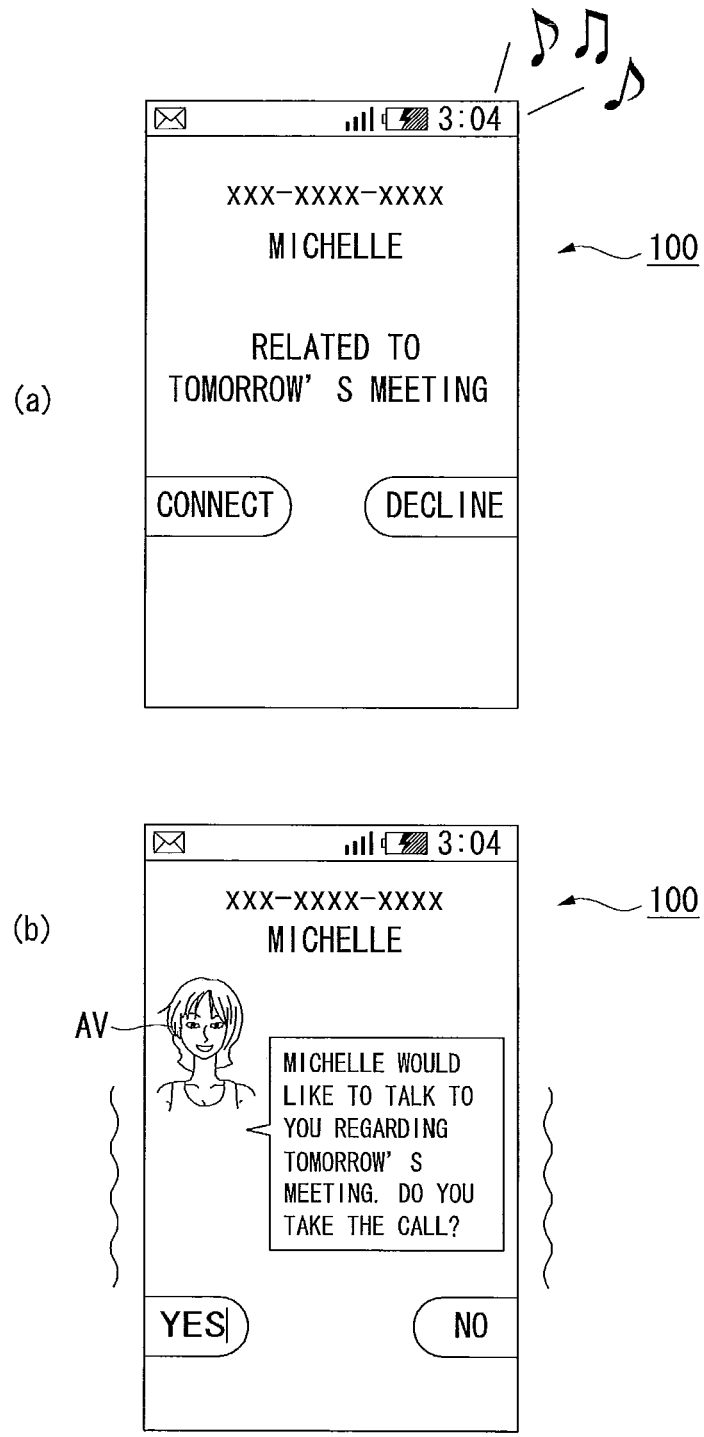
FIG. 9 illustrates an operation of an electronic device when a request of a call response is sent to the user according to an embodiment of the present invention.

FIG. 9 illustrates an operation of an electronic device when a request of a call response is sent to the user according to an embodiment of the present invention. First, referring to (a) of FIG. 9, the mobile terminal 100 displays a phone number and name (or, another similar identifiable name) of a calling party and why the calling party has called through the display unit 151 and outputs a bell sound through the audio output module 152. Further, the display unit 151 displays a user interface to inquire whether the IA 182 determines that the current circumstance is an emergency circumstance and thus transfers the call to the calling party so that the user may directly take the call or allows the user to decline the call and to receive the user's response to the inquiry.

Subsequently, referring to (b) of FIG. 9, unlike what is illustrated in (a) of FIG. 9, an avatar (AV) corresponding to the IA 182 is displayed together with text explaining the calling party's purpose of the call as if the avatar AV explains the circumstance for a call connection like a personal assistant. Further, referring to (b) of FIG. 9, the mobile terminal 100 is vibrating rather than a bell sound being output so as to allow the user to recognize the request for an emergency call. As shown in FIG. 9, the mobile terminal 100 may perform various output operations for the automatically received call to be passed over to the user.

Meanwhile, compared with an image alerting the user to call receipt, which is generally displayed by general smart phones upon call receipt, the images illustrated in FIG. 9 further add a summary based on the automatic conversation performed between the IA 182 and the calling party. However, the image for the IA 182 to allow the user to directly respond to the call is not limited to what is shown in (a) of FIG. 9, and at least one or more of the calling party's phone number, name, summary on the purpose of the call, and the user interface to input whether the direct response is made to the call may be omitted. Or, more information may be displayed by the display unit 151.

Meanwhile, the IA 182 may determine the degree emergency as well as whether the calling party's call is urgent when determining whether the current circumstance is an emergency circumstance or not based on the automatic conversation. Upon alerting the user to the request of direct call response through the mobile terminal 100, the IA 182 may change the configuration of an image and/or sound according to the degree of emergency. For example, when the current circumstance is determined to have an average degree of emergency, the mobile terminal 100 may issue an output as illustrated in FIG. 9, however, if the current circumstance is determined to have a very high degree of emergency circumstance, the mobile terminal 100 may issue an output as illustrated in FIG. 10.

Figure 10:
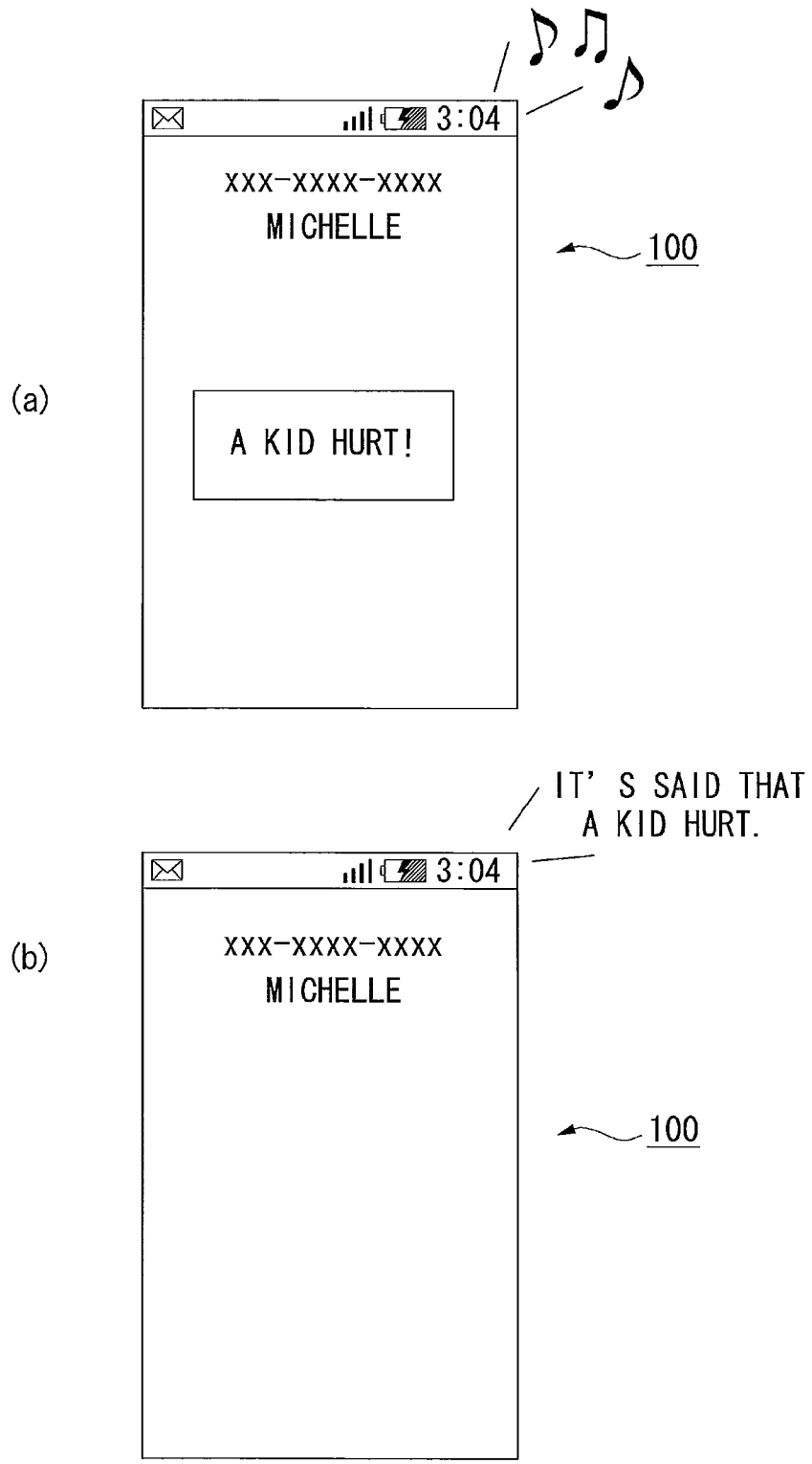
FIG. 10 illustrates another exemplary operation of an electronic device when a request of a call response is sent to the user according to an embodiment of the present invention.

FIG. 10 illustrates another exemplary operation of an electronic device when a request of a call response is sent to the user according to an embodiment of the present invention. Referring to (a) of FIG. 10, the IA 182 may determine that a circumstance where a kid is hurt is a high degree of emergency circumstance and may output summarized information with a font size larger than that illustrated in FIG. 9 so as to transfer better the above circumstance to the user. Further, the IA 182 may output a bell sound at a highest volume, disregarding the bell sound volume set in the mobile terminal 100. Or, to alert the user to the emergency circumstance in a further direct way, as shown in (b) of FIG. 10, the IA 182 may output the summarized information while displaying the summarized information in text in a other way than outputting the bell sound. Further, as shown in FIG. 10, in the case that the current circumstance is a very high degree of emergency circumstance, unlike what is illustrated in FIG. 9, the IA 182 may refrain from providing the user interface to allow the user to accept or decline the direct response to the call.

As described above, the IA 182 may stand by for the user's input after performing the second operation S108 (S109). For example, as shown in FIG. 9, the IA 182 may output a user interface to inquire whether the user desires to accept the direct call and may stand by for the user's input in response thereto. As another example, as shown in FIG. 10, in the case that the IA 182 does not output the user interface to inquire whether to accept the direct call, the IA 182 may stand by for receipt of the user's input (e.g., a touch on any region of the touch screen) for a predetermined type of a direct talk.

The IA 182 may monitor whether there is the user's input (S110). In the case that there is no user's input for a predetermined time, the process proceeds to step S107 to perform a first operation that will be described later, and in the case that there is the user's input, the IA 182 performs step S111.

In step S111, the IA 182 may determine whether the user's input is to accept the direct call. For example, in the example illustrated in (a) of FIG. 9, when an input is performed on an object indicated as "accept", for example, by touching a portion indicated as "accept" or by touching the portion and sliding in a predetermined or any direction, the IA 182 may determine that there is an input to allow the user to accept the direct talk. On the contrary, in the case that an input is performed on a portion indicated as "decline" on the image shown in (a) of FIG. 9, the IA 182 may determine that there is an input to allow the user to decline the direct talk.

According to the result of the determination in step S111, in the case that the user's input is to accept the direct talk, the IA 182 performs step S115 shown in FIG. 4, which will be described later, so that the user may directly talk to the calling party, and in the case that the user's input is to decline the direct call, the IA 182 enters into step S107 to perform the first operation to be described later.

The operation of the mobile terminal 100 when the IA 182 determines through the automatic conversation that the calling party's call is urgent has been so far described.

Hereinafter, referring to FIG. 3 and its relating figures, an operation of the mobile terminal 100 when the IA 182 determines that the calling party's call is not urgent will be subsequently described in detail.

In step S106, in the case that the current circumstance is not the first circumstance (e.g., in the case that the calling party's call is not determined to be urgent), the IA 182 may perform the first operation (S107).

Figure 11:
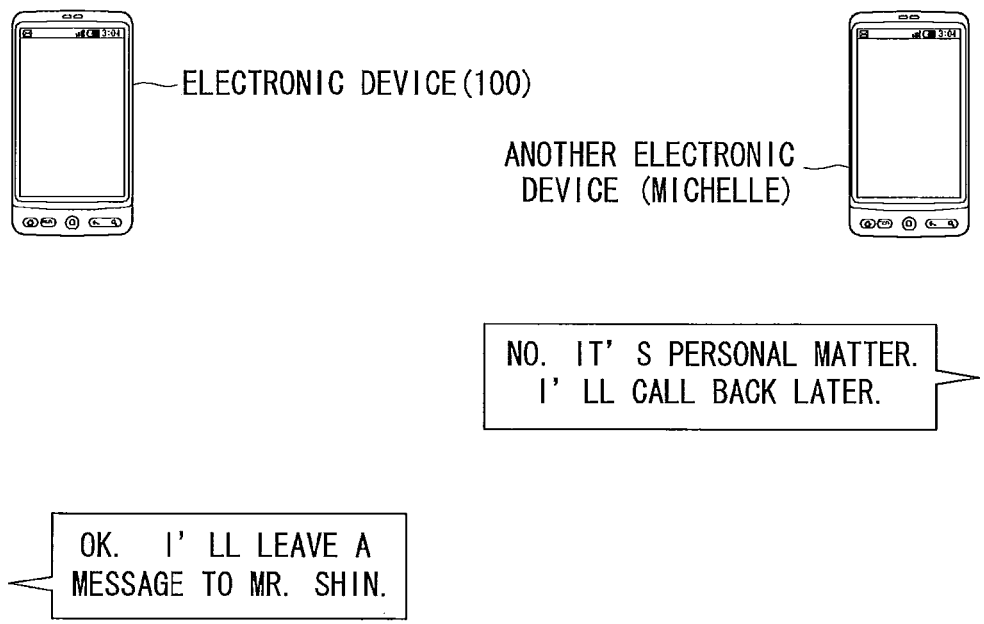
FIG. 11 is a view illustrating an example of an automatic conversation which is not determined to be the first circumstance according to an embodiment of the present invention.

Various methods by which the IA 182 determines whether the current circumstance is an emergency circumstance have been already described above, and the detailed description will be omitted. FIG. 11 is a view illustrating an example of an automatic conversation which is not determined to be the first circumstance according to an embodiment of the present invention. In particular, FIG. 11 may illustrate the automatic conversation continued from the automatic conversation illustrated in FIG. 6.

As illustrated in FIG. 11, in the case that the calling party gives up the direct talk with the user through the automatic conversation with the IA 182, the IA 182 may determine that the calling party's call is not urgent.

As such, in the case that the calling party's call is not the emergency circumstance, the IA 182 may perform the first operation, which basically includes preparation operations that allow the automatic conversation executed by the IA 182 to be transferred to the user later. The first operation may include various operations. Hereinafter, the first operation will be described in greater detail.

First, the IA 182 may draft a transmission message to be transferred to the user later and may store the drafted message. The transmission message may include whole or part of the automatic conversation with the calling party and information on the calling party (e.g., a phone number and/or name of the calling party). The automatic conversation may be stored as a voice itself or the calling party's voice and the sentence and/or phrase transferred by the IA 182 to the calling party may be converted into text by using an STT engine, and the text may be stored. Further, the IA 182 may generate a summarized conversation including only critical content based on the automatic conversation, and the transmission message may include the summarized conversation. The IA 182 may store at least one of the whole conversation and the summarized conversation. That is, the IA 182 may store only one of the two or both. Subsequently, the IA 182 may terminate the call connected in step S104. The IA 182 may perform step S117 illustrated in FIG. 5 after performing the above-described first operation. This will be described later.

An example where, upon call receipt, the call receiving mode is preset in the automatic mode has been so far described. Hereinafter, an operation of the mobile terminal 100 when the call receiving mode is the normal mode will be described.

Figure 4:
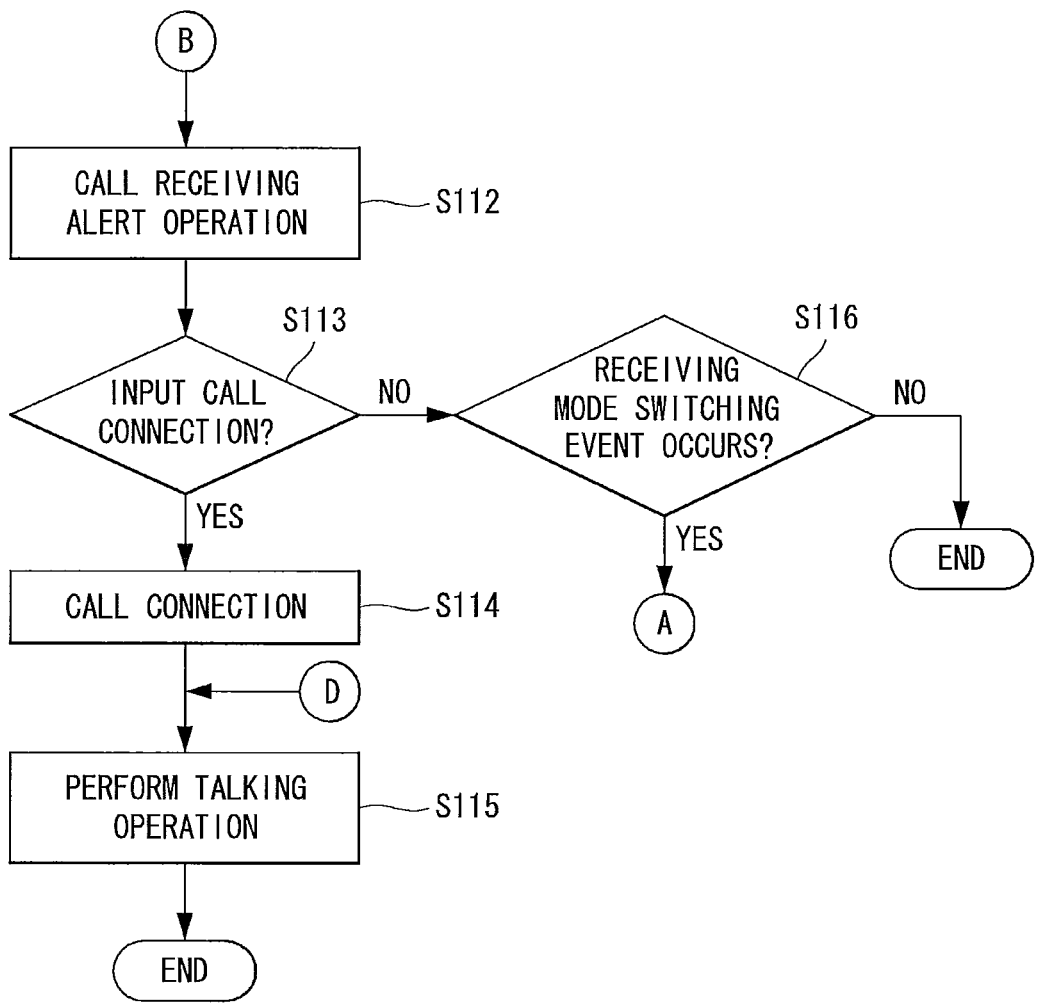
FIG. 4 is a flowchart illustrating a method of controlling an electronic device in the case that the call receiving mode is the normal mode according to an embodiment of the present invention.

FIG. 4 is a flowchart illustrating a method of controlling an electronic device in the case that the call receiving mode is the normal mode according to an embodiment of the present invention.

Referring to FIG. 4, the IA 182 may perform a call receiving alert operation to alert the user to a call being received by various methods (S112). For example, like outputting a bell sound, the IA 182 may notify the user that a call is auditorily being received through the audio output module 152. The IA 182 may notify the user that the call is visually being received through the display unit 151, or may notify the user that the call is being received to the user by generating a vibration through the haptic module 154.

Subsequently, the IA 182 may monitor whether an input of requesting a call connection is received from the user (S113). Step S113 may be performed only for a predetermined time after call receipt initiates. Or, step S113 may be performed only for a predetermined time after the call receiving alerting operation starts. While step S113 is performed, in the case that an input of requesting a call connection from the user is received from the user, the IA 182 performs step S114, but while no input of requesting a call connection is received, the IA 182 may monitor whether the call receiving mode set in the mobile terminal 100 have switched from the normal mode to the automatic mode (S116).

First, steps S114 and S115 are described and step S116 is then described.

The IA 182 may connect a call that is being received (S114). Then, the mobile terminal 100 may be prepared so that the calling party and the user of the mobile terminal 100 may perform a talk. Subsequent to step S114 or simultaneously with step S114, the IA 182 may perform a call operation (S115). Step S115 may include an operation of activating modules necessary to perform the call operation among the constitutional elements included in the mobile terminal 100. For example, in the case that a received call is a voice call, the IA 182 may activate the audio output module 152 and the microphone 122. As another example, in the case that the received call is a video call, the IA 182 may activate the audio output module 152, the microphone 122, the display unit 151, and the camera 121. Accordingly, the mobile terminal 100 may finish preparation for the user to perform a talk with the calling party. Subsequently, step S115 may output a voice and/or an image received from the calling party through the audio output module 152 and/or the display unit 151, and may receive the voice and/or image from the user of the mobile terminal 100 through the microphone 122 and/or the camera 121 and then may transfer it to the calling party.

Step S115 may be performed until an event for terminating the call (e.g., when the user presses an end button), and when the event for terminating the call, the IA 182 may terminate the connected call. Steps S114 and S115 which have been described above may not be greatly different from receiving a call and performing the call by the conventional smart phone and/or mobile phone.

Subsequently, step S116 is described. Step S116 monitors whether an event for switching the calling mode occurs while the call receiving alert operation is performed in the state where the call receiving mode is set in the normal mode. Various types of events may be used for switching the calling mode.

First, the mobile terminal 100 may provide through the display unit 151 a user interface for switching the calling mode when the call receiving alert mode is performed in step S112, and in the case that the user performs input for switching the receiving mode through the provided user interface, the IA 182 may determine that an event for switching the receiving mode occurs.

Figure 12:
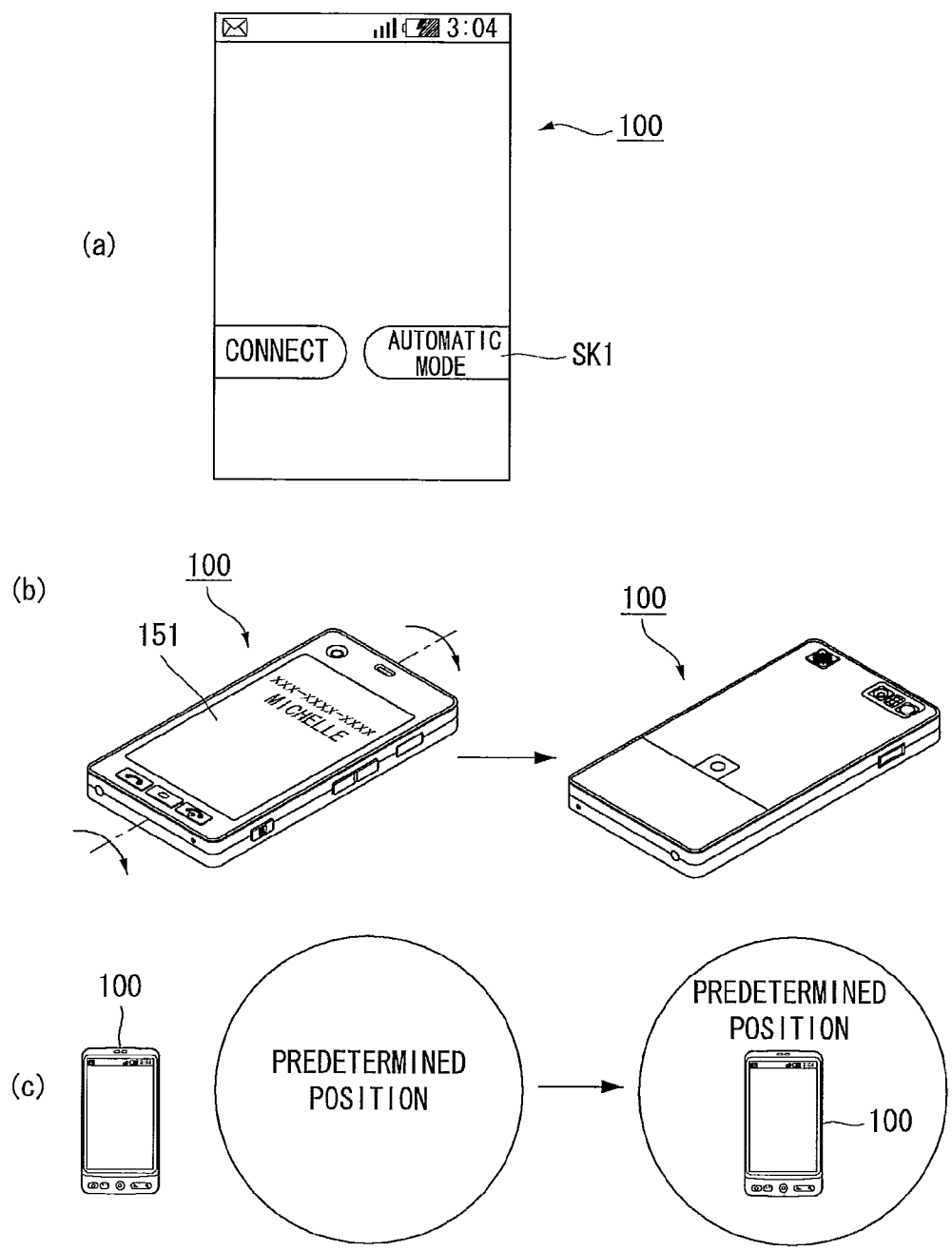
FIG. 12 illustrates an event for switching the calling mode according to an embodiment of the present invention.

FIG. 12 illustrates an event for switching the calling mode according to an embodiment of the present invention. For example, as shown in (a) of FIG. 12, the IA 182 may provide a soft key SK1 for switching the receiving mode in step S112, and in the case that the user performs input with the soft key SK1 by a predetermined scheme, the IA 182 may determine that an event for switching the receiving mode occurs.

Second, in the case that while the mobile terminal 100 performs the call receiving alert operation, the mobile terminal 100 moves according to a predetermined scheme, the IA 182 may determine that an event for switching the receiving mode occurs. For example, as shown in (b) of FIG. 12, in the case that the mobile terminal 100 is flipped over by the user's manipulation so that the display unit 151 is oriented downward while the call receiving alert operation is performed with the mobile terminal 100 positioned so that the display unit 151 faces upward, the IA 182 may determine that an event for switching the receiving mode occurs. Although (b) of FIG. 12 only illustrates "flip over" as an example where the mobile terminal 100 is moved according to a predetermined scheme, for example, shaking the mobile terminal 100 left and right at least once or more may also be set as the movement according to the predetermined scheme.

Third, the user may set the mobile terminal 100 so that when the mobile terminal 100 enters into a specific position, the call receiving mode switches to the automatic mode. As shown in (c) of FIG. 12, in the case that when a call starts to be received, the mobile terminal 100 does not enter into the specific position, but while the call receiving alert operation is performed, the mobile terminal 100 enters into the specific position, the IA 182 may determine that an event for switching the call receiving mode occurs.

As described above, in the case that the event for switching the receiving mode in step S116 is determined to occur, the IA 182 may perform the above-described step S104 and its subsequent operations.

Accordingly, in the case that the user failed to switch the receiving mode of the mobile terminal 100 to the automatic mode before a conference begins or before the user attends an important appointment, an event for switching the receiving mode may be generated so that the IA 182 may instead take the call. Thus, the conference and/or the important appointment is not interfered and a more effective response may be made to the call of the calling party.

Figure 5:
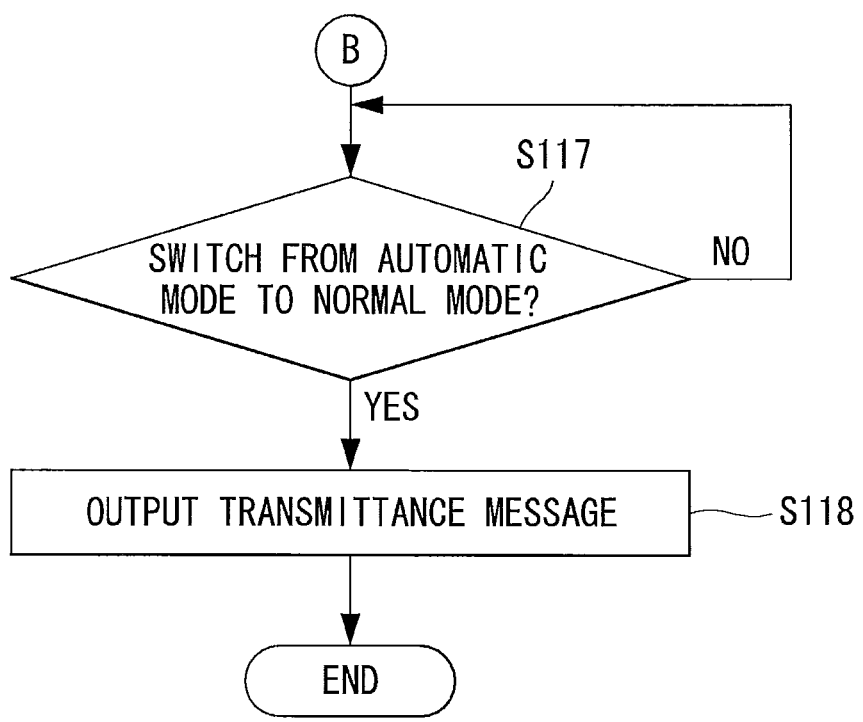
FIG. 5 is a flowchart illustrating a method of controlling an electronic device for outputting a transmittance message generated through an automatic conversation with a calling party which is made according to an embodiment of the present invention.

Subsequently, referring to FIG. 5, a method of controlling an electronic device for outputting a transmittance message generated through an automatic conversation with a calling party which is made according to an embodiment of the present invention. FIG. 5 is a flowchart illustrating a method of controlling an electronic device for outputting a transmittance message generated through an automatic conversation with a calling party which is made according to an embodiment of the present invention.

As described above in connection with step S107, while set in the automatic mode, the IA 182 may perform an automatic conversation with the calling party to be able to generate a transmittance message that is to be transferred to the user. The transmittance message thus generated may be transferred to the user later. For example, as illustrated in FIG. 5, the IA 182 may monitor whether the call receiving mode set in the mobile terminal 100 switches from the automatic mode to the normal mode (S117). Accordingly, in the case that the call receiving mode is determined to switch to the normal mode, the IA 182 may output the transmittance message generated as described in connection with step S107 to the user (S118).

The transmittance message may be output by various methods. For example, the transmittance message may be auditorily output to the user, and the transmittance message may be converted into text or an image, and may be then visually output to the user.

As the call receiving mode switches to the normal mode, the transmittance message may be simultaneously output to the user. Or, when there is a special request from the user after the call receiving mode switches to the normal mode, the transmittance message may be output to the user.

While the call receiving mode remains set in the automatic mode, a plurality of transmittance messages may be created, and the created plurality of transmittance messages may be all output to the user. At this time, the plurality of transmittance messages may be output in a predetermined order or the order of outputting the plurality of transmittance messages may be determined by the user's selection.

By doing so, the user may verify the transmittance message generated by the automatic conversation with the calling party of the call received while the call receiving mode remains set in the automatic mode, and as the user verifies the transmittance message, the user may grasp why the calling party called him and then the user may directly talk to the calling party as necessary, so that the user may more efficiently communicate with the calling party.

The first embodiment of the present invention has been so far described. Hereinafter, a second embodiment of the present invention is described with reference to FIG. 13.

Figure 13:
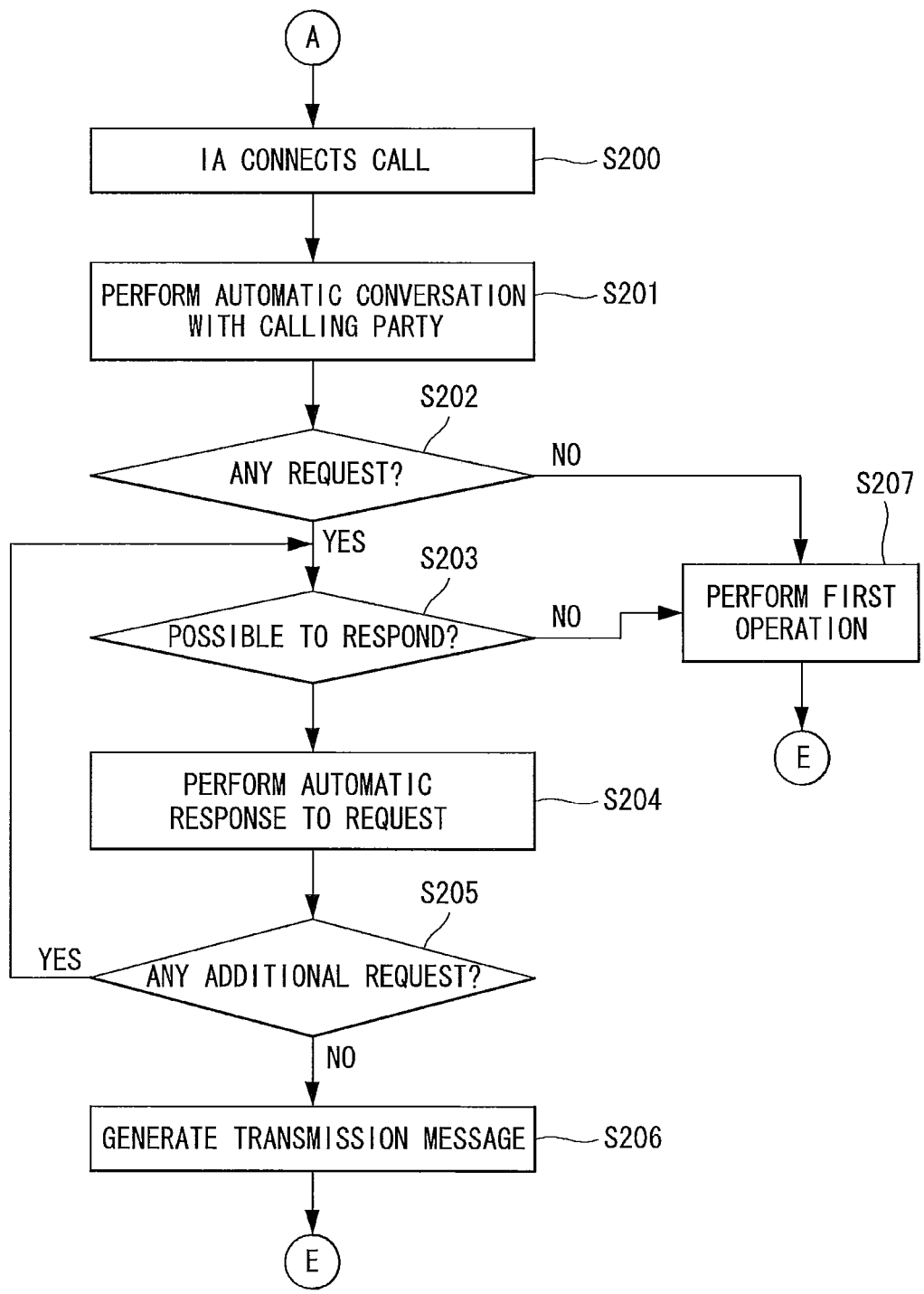
FIG. 13 is a flowchart illustrating a method of controlling an electronic device according to a second embodiment of the present invention.

FIG. 13 is a flowchart illustrating a method of controlling an electronic device according to a second embodiment of the present invention.

Referring to FIG. 13, in the case that the call receiving mode is set in the automatic mode, the IA 182 may connect the received call (S200) and then may perform an automatic conversation with the calling party (S210). This is similar to the operations described in connection with steps S104 and S105 of FIG. 3, and thus, the detailed description will be omitted.

Subsequently, the IA 182 may determine through the automatic conversation whether there is a request of the calling party (S202). For example, the calling party may intend to call the user of the mobile terminal 100 to ask another person's contact information, such as his email address or phone number or may desire to check the schedule of the user of the mobile terminal 100. The IA 182 may verify the request of the calling party through the automatic conversation. As such, the IA 182 may verify whether there is a request of the calling party through the automatic conversation, and if the calling party's request is verified, the IA 182 may perform step S203 and unless the calling party's request is verified, the IA 182 may perform step S207.

If in step S202 the calling party's request is verified, the IA 182 may determine whether the IA 182 may respond to the verified request (S203). The IA 182 may consider various factors to determine whether the request may be responded.

First, the IA 182 may grasp whether it may access information for responding to the request. For example, the IA 182 may verify whether the information on the calling party's request is stored in the memory 160 of the mobile terminal 100 and/or another electronic device to which the mobile terminal 100 may be connected. That is, in the case that the calling party's request is another person's contact information, the IA 182 may verify whether the request may be responded by the IA 182 by identifying whether the other person's contact information is stored in the memory 160 of the mobile terminal 100 and/or the other electronic device that may be connected to the mobile terminal 100.

Second, the IA 182 may consider access right that is assigned to the calling party. The access right, which is assigned to the calling party, may be assigned by a predetermined algorithm or by the user of the mobile terminal 100.

For example, when it comes to an access right for the contact information, the IA 182 may assign a access right only to persons that are classified in the same group as the calling party in the phone book. That is, in the case that the calling party is classified in group A of the phone book, the calling party is assigned with an access right that allows the calling party to only other persons belonging to group A, and the access right does not allow the calling party to access persons belonging to the other groups than group A. As another example, in relation to an access right for a schedule, the IA 182 may provide the access right to only a schedule associated with the calling party. That is, in the case that the calling party is scheduled to attend a specific schedule, the calling party may be provided with an access right only for information on the schedule which he is supposed to attend but not with any access right for schedules that the calling party does not attend.

Third, the IA 182 may consider whether to be able to access and/or an access level, which are set by the user of the mobile terminal 100 with respect to information that needs to be accessed in response to the calling party's request. That is, in the case that contact information on a specific person is set not to be accessible by the user, the IA 182 may determine that no response may be made to a request for the contact information of the specific person.

The IA 182 may determine whether the calling party's request may be responded in consideration of various factors that have been described above, but not limited thereto. At this time, in the case that the calling party's request is determined to be able to be responded, the IA 182 may perform step S204, but in the case that the calling party's request is determined not to be able to be responded, the IA 182 may perform step S207.

In the case that the calling party's request is determined to be able to be responded, the IA 182 may perform an automatic response to the request (S204). That is, in the case that the calling party requests contact information of another person, the IA 182 may send the other person's contact information to the calling party. Subsequently, the IA 182 may continuously perform an automatic conversation with the calling party, and by doing so, the IA 182 may determine whether there is an additional request of the calling party (S205). In the case that it is determined that there is an additional request, the IA 182 returns the process to step S203 to be able to perform the above-described series of operations. In the case that it is determined that there is no additional request, the IA 182 may terminate the connected call and may generate a transmittance message so that the automatic conversation with the calling party may be sent to the user (S206).

It has been so far described how to control the mobile terminal 100 in the case that the calling party's request is identified through the automatic conversation performed by the IA 182.

Meanwhile, in the case that no request from the calling party is identified or the calling party's request is not able to be responded, a third operation may be performed (S207).

The third operation is to perform an operation similar to step S107 of FIG. 3, and the third operation basically includes preparation operations that allow the automatic conversation performed by the IA 182 to be able to be transferred to the user later. Like the first operation, the third operation may include various operations. Such various operations that may be included in the third operation may include all the operations that have been described in connection with the first operation, and further detailed description thereof will be omitted.

Meanwhile, in the second embodiment, in relation to the automatic conversation performed in the automatic mode, as described in connection with FIG. 5, the IA 182 may perform the operation of transferring the transmittance message to the user later.

Further, in the second embodiment, in the case that the call receiving mode is not set in the automatic mode, an operation similar to that in the first embodiment may be performed, and further detailed description thereof will be omitted.

Hereinafter, the third embodiment of the present invention, where the IA 182 automatically responds to not a call but a message, is described.

FIGS. 14 to 17 are flowcharts illustrating a method of controlling an electronic device that automatically responds to a message according to the third embodiment of the present invention.

Figure 14:
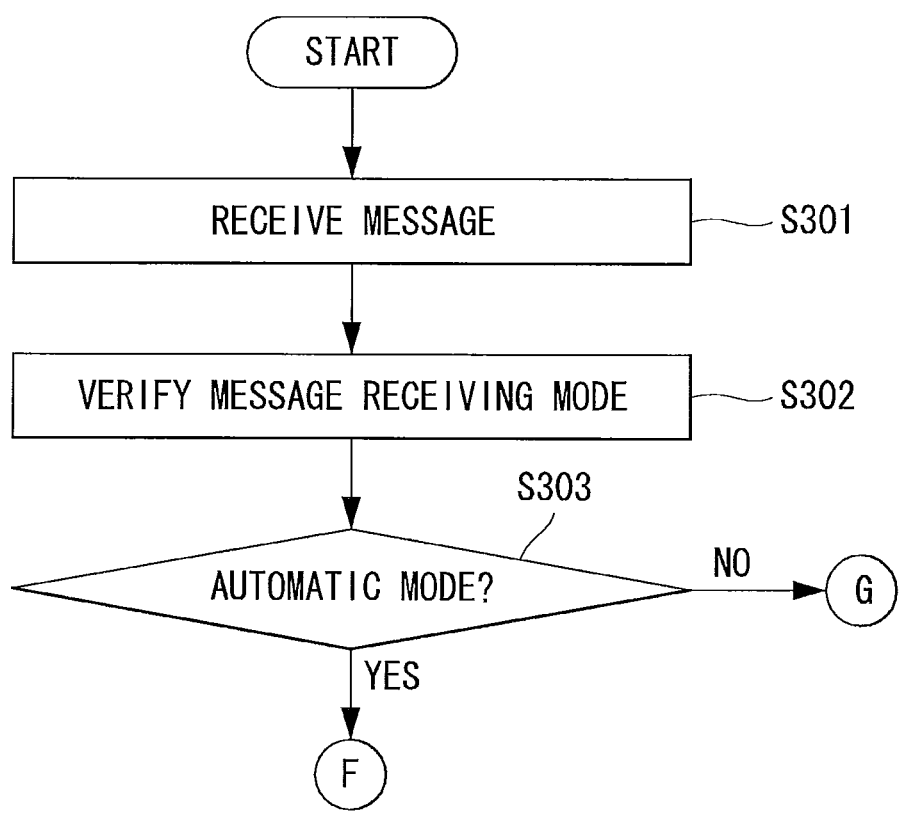
FIGS. 14 to 17 are flowcharts illustrating a method of controlling an electronic device that automatically responds to a message according to the third embodiment of the present invention.

Referring to FIG. 14, in the case that a message is received by the mobile terminal 100 (S301), the mobile terminal 100 may verify a message receiving mode that is currently set in the mobile terminal 100 (S302). Step S302 may be performed by the controller 180 or the IA 182.

According to the present invention, similar to the call receiving mode, the message receiving mode of the mobile terminal 100 includes an automatic mode and a normal mode. For convenience of description, when describing the present invention, it is assumed that either the automatic mode or the normal mode is set in the mobile terminal 100. However, the message receiving mode of the mobile terminal 100 may include other modes than the two modes. The message receiving mode of the mobile terminal 100 may be set by various methods, which will be described in detail later. The message receiving mode may be set depending on the call receiving mode or independently from the call receiving mode. That is, in the case that the call receiving mode is set in the automatic mode, the message receiving mode may be also set in the automatic mode like the call receiving mode, or the message receiving mode may be independently set regardless of the call receiving mode.

Subsequently, the mobile terminal 100 may determine whether the current mode is the automatic mode (S303), and in the case that the message receiving mode of the electronic device is set in the automatic mode, the mobile terminal 100 may perform step S304 of FIG. 15, and in the case that the message receiving mode of the electronic device is set in the normal mode (that is, unless the message receiving mode is set in the automatic mode), the mobile terminal 100 may perform step S310 of FIG. 16.

According to the third embodiment of the present invention, in the case that the message receiving mode is set in the automatic mode, the mobile terminal 100 may perform a conversation with the calling party through messages instead of the user by the operation of the IA 182, and as necessary, may allow the user to directly perform the conversation through messages. Or, after necessary matter is identified, the conversation through the messages may be terminated. FIG. 15 is a view illustrating a method of automatically responding to a received message in the case that the automatic mode is set in the electronic device according to the third embodiment of the present invention.

Figure 15:
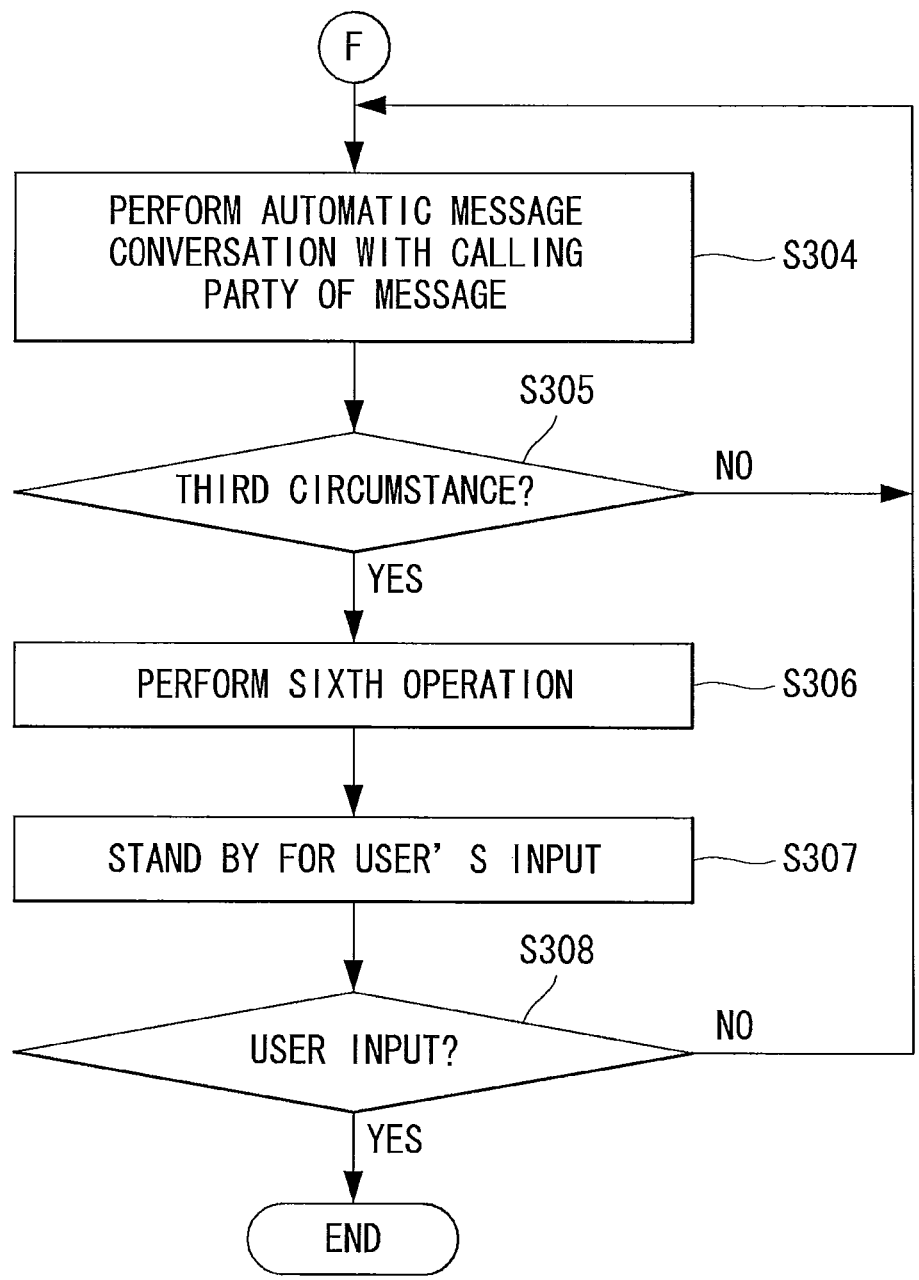

Referring to FIG. 15, the IA 182 may allow the received message to be automatically responded. Hereinafter, to distinguish the automatic response and/or automatic conversation through messages from the automatic conversation through a call connection, the automatic response and/or automatic conversation through messages is referred to as an automatic message conversation for convenience.

In the case that a message is received while the message receiving mode of the mobile terminal 100 is set in the automatic mode, the mobile terminal 100 may refrain from alerting the user to receipt of the message. For example, upon message receipt, the known mobile phones or smart phones alert users to message receipt by outputting a message receiving alert sound, displaying a message receiving image on the display unit 151, or by vibration, so that the user may perform predetermined entry for a message connection in response. However, in the case that the automatic mode is set in the mobile terminal 100 according to the present invention, the mobile terminal 100 may actively respond to the message receipt on behalf of the user, thus eliminating the need of alerting the user to the message receipt.

The IA 182 may perform an automatic message conversation with the calling party of the received message (S105).

The IA 182 may recognize information included in the message, properly generate a response message for the information included in the message on its own according to the recognized result, and transfer the response message to the calling party of the message (that is, another electronic device used by the calling party).

The received message may include text, an image, a voice file, a video file, or a combination of at least one or more thereof, and the response message may also include text, an image, a voice file, a video file, or a combination of at least one or more thereof.

The calling party of the message may transfer another message to the mobile terminal 100 in response to the response message from the IA 182 as described above, and the IA 182 may repeatedly perform the above-described scheme to properly respond to the calling party.

That is, in the case of being set in the automatic receiving mode, the IA 182 may naturally proceed with a conversation with the calling party of the message. To perform such a automatic message conversation, not only a text recognition technology, voice recognition technology, an image recognition technology but also a natural processing technology for grasping the meaning of natural language included in text, an image, or voice data may apply to the IA 182.

Meanwhile, while the automatic message conversation is performed in step S304, the IA 182 may transfer a response message, which is created on its own, to the calling party. At this time, the IA 182 may create the response message with the fact that the response message is created by the IA 182 indicated. For example, the response message may be indicated with the IA 182's signature in text and/or an image. As another example, an avatar image of the IA 182 may be included in the response message. As still another example, similar to the automatic conversation illustrated in FIG. 6, the response message may include the fact that the response message is transmitted by the IA 182 instead of the user of the mobile terminal 100.

As such, the IA 182 may properly respond to the calling party's message in a natural way by performing the automatic message conversation with the calling party as a virtual assistant of the user of the mobile terminal 100. In the case that the user may not directly respond to the message, the implementation of the automatic message conversation by the IA 182 enables the IA 182 to receive the call instead by switching the message receiving mode of the mobile terminal 100 to the automatic mode. Accordingly, in the conventional situations where it is impossible or difficult to respond to the message, the message is intentionally disregarded or is unintentionally not responded, or it is notified that it is difficult to simply respond to the message, so that any inconvenience that may happen to the calling party may be mitigated.

The IA 182 may determine whether the current circumstance corresponds to a third circumstance based on the automatic message conversation while performing the automatic message conversation in step S304 (S305). The third circumstance may include at least an emergency circumstance. That is, the IA 182 may determine whether the calling party of the message needs to urgently perform a direct conversation with the user while performing the automatic message conversation with the calling party.

To determine whether the current circumstance is the emergency circumstance, the IA 182 may use various schemes. Such schemes may include at least some of the above-described schemes of determining whether the current circumstance is the emergency circumstance through the automatic conversation. That is, the IA 182 may determine whether the current circumstance is the emergency circumstance by directly grasping the calling party's intention through the natural language process, and in the case that the message includes voice data and/or video data, may determine the degree of emergency of the current circumstance by analyzing the calling party's voice. This has been described above in detail, and thus, further detailed description will be omitted.

In the case that the IA 182 determines whether the current circumstance is the third circumstance (e.g., emergency circumstance) according to the above-described schemes and determines that the current circumstance is the third circumstance, the IA 182 performs step S306, and in the case that the current circumstance is determined to not be the third circumstance, the IA 182 may return the process to step S304.

In the case that the current circumstance is determined to be the third circumstance, the IA 182 may perform a sixth operation (S108). The sixth operation basically includes operations performed to enable the user to directly respond to the received message, and the sixth operation may include various operations. Hereinafter, the sixth operation is described more specifically.

First, the IA 182 may output an alert of requesting that the user directly respond to the message. For example, the IA 182 may output a message alert sound that is output upon message receipt, a vibration, or an image of requesting a response to the message.

At this time, the IA 182 may visually and/or auditorily output an image including an automatic conversation with the calling party to the user.

Or, the IA 182 may summarize why the calling party sent the message to the user based on the automatic message conversation performed in step S304 and may visually and/or auditorily output the summarized result so that the user may recognize it. This may be performed in a similar way to what has been described in connection with FIG. 7.

As described above, the IA 182 may stand by for the user's input after performing the sixth operation (S306) (S307). For example, the IA 182 may output a user interface through which information is entered so that the user may respond to the message and may stand by for the user's input in response.

Subsequently, the IA 182 may monitor whether there is the user's input (S308), and in the case that there is no user's input for a predetermined time, the IA 182 returns the process to step S304 to perform the automatic message conversation, and in the case that there is the user's input, the IA 182 terminates the process. It has been described above that upon message receipt, the message receiving mode is already set in the automatic mode. Hereinafter, an operation of the mobile terminal 100 when the message receiving mode is the normal mode is described.

Figure 16:
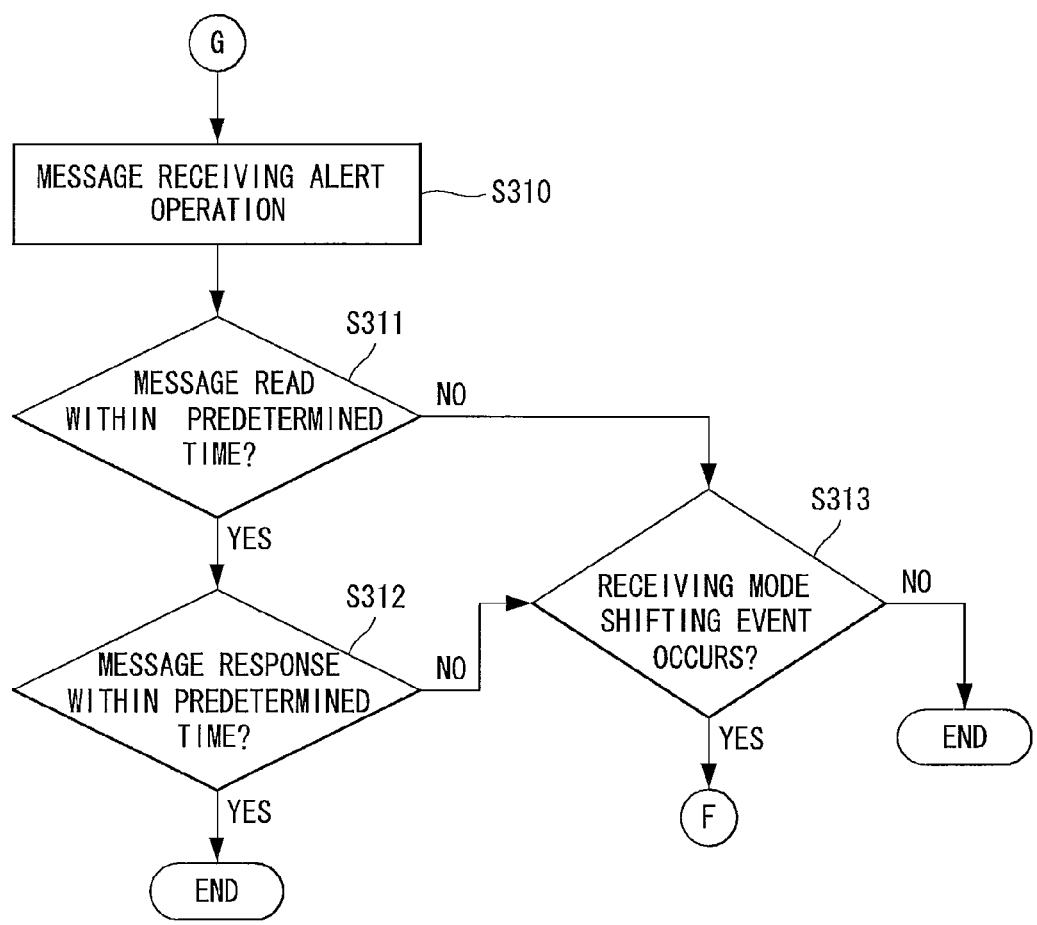

Referring to FIG. 16, the IA 182 may perform a message receiving alert operation to alert the user to the message being received by various methods (S310). For example, like outputting a message receiving alert sound, the IA 182 may auditorily alert the user to the message receiving through the audio output module 152, may visually alert the user to the message receiving through the display unit 151, or may create a vibration through the haptic module 154 to alert the user to the message receiving.

Subsequently, the IA 182 may monitor whether the user has read the message within a predetermined time (S311) and/or has responded to the received message within a predetermined time (S312). In the case that while performing step S311 and/or step S312 the user is not determined to have read the message or the user is determined to have not sent a message responding to the message, the IA 182 may perform step S313 but in the case that the user read the message and then sent a response message responding to the received message, the IA 182 may terminate the process.

The IA 182 may also monitor whether an event in which the message receiving mode set in the mobile terminal 100 switches from the normal mode to the automatic mode has occurred (S313). Various types of events may occur to switch the message receiving mode. The event to switch the message receiving mode may be similar to the event to switch the call receiving mode. That is, the mobile terminal 100 may provide a user interface to switch the receiving mode through the display unit 151, and in the case that the user performs an input to switch the receiving mode through the user interface provided by the user, the IA 182 may determine that the event to switch the receiving mode has occurred. Or, in the case that the mobile terminal 100 moves according to a predetermined scheme, the IA 182 may determine that the event to switch the receiving mode has occurred. Or, the IA 182 may determine entry into a predetermined position as occurrence of the event to switch the receiving mode. Further, in the case that whether to receive the message has been notified to the user but it is determined that the user did not read the message within a predetermined time or the user did not send a response message responding to the message, the IA 182 may determine that the event to switch the message receiving mode has occurred.

As described above, in the case that it is determined in step S313 that the event to switch the receiving mode has occurred, the IA 182 may perform step S304 and its subsequent operations as described above.

By doing so, in the case that the user fails to switch the receiving mode of the mobile terminal 100 to the automatic mode before the conference starts or before the user attends an important appointment, the event to switch the receiving mode may be generated so that the IA 182 may instead respond to the message. Accordingly, the conference and/or important appointment may not be interfered and the calling party's call may be more efficiently responded.

Subsequently, a method of controlling an electronic device to output a history of an automatic message conversation with the calling party, which is created according to an embodiment of the present invention, will be described with reference to FIG. 17.

Figure 17:
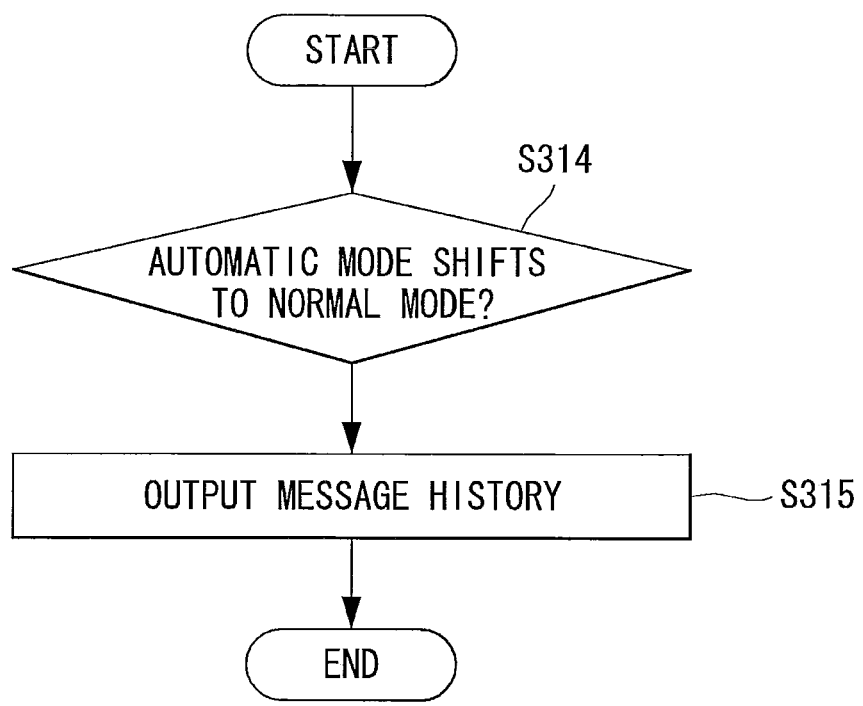

As illustrated in FIG. 17, the IA 182 may monitor whether the message receiving mode switches from the automatic mode to the normal mode (S314). In the case that it is determined in step S314 that the message receiving mode set in the mobile terminal 100 switches from the automatic mode to the normal mode, the IA 182 may output a history of the automatic message conversation that was performed by the IA 182 while the mobile terminal 100 remained set in the automatic mode.

The history may be output the user by various methods. For example, the history may be auditorily output to the user, or may be visually output to the user in text or an image.

The history may be output to the user when the message receiving mode is simultaneously switched to the normal mode. Or, the history may be output to the user when there is the user's special request after the message receiving mode is switched to the normal mode.

While the message receiving mode remains set in the automatic mode, a plurality of histories may be created, and the created plurality of histories may be all output to the user. At this time, the plurality of histories may be output in a predetermined order or in an order determined by the user's selection.

By doing so, the user may identify the history generated by the automatic message conversation with the calling party of the message received while the receiving mode is set in the automatic mode, and as he identifies the history, may grasp whey the calling party has sent the message, and as necessary, may directly call back the calling party or may perform a message conversation, so that communication with the calling party of the message may be more efficiently performed.

On the other hand, instead of or simultaneously with outputting the message history, the IA 182, in step S315, may output a transmittance message generated by performing the automatic message conversation with the calling party of the message while the receiving mode is set in the automatic mode. The method of generating the transmittance message has been described above in detail in connection with the first embodiment, and further detailed description will be skipped.

According to the third embodiment of the present invention, the method of performing the automatic message conversation by the IA 182 in response to the received message has been described. At this time, the message described in the third embodiment is not limited to SMS messages or MMS messages, and various messages, which are provided through various SNS services or by various messaging applications, may be included therein.

Hereinafter, a fourth embodiment of the present invention is described.

Figure 18:
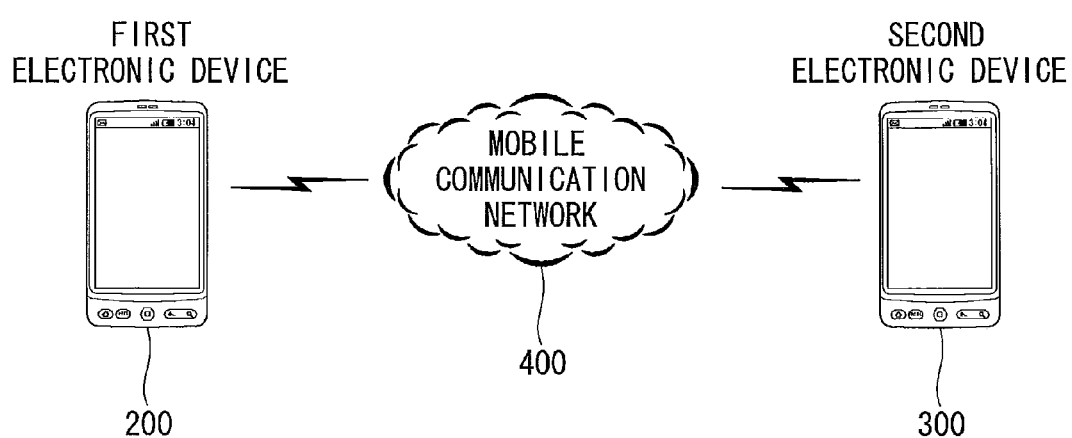
FIG. 18 is a view schematically illustrating an operational environment of a first electronic device according to the fourth embodiment of the present invention, a mobile communication network (i.e., a base station or control station in charge of controlling the mobile communication network, or a server of controlling the operation of the base station or control station), and a second electronic device.
Figure 19:
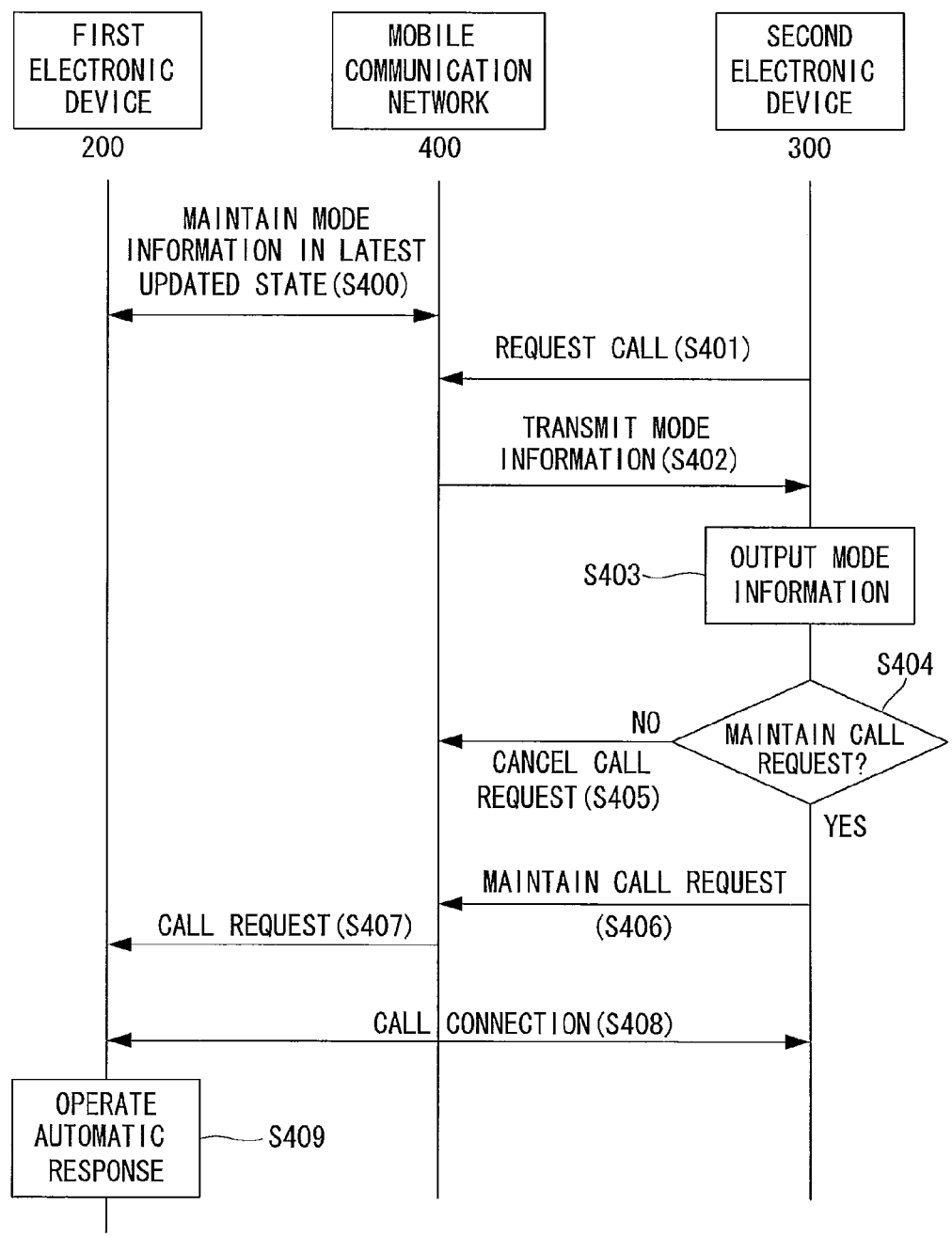
FIG. 19 is a view illustrating a method of controlling the first electronic device, the mobile communication network, and the second electronic device according to the fourth embodiment of the present invention.

FIG. 18 is a view schematically illustrating an operational environment of a first electronic device according to the fourth embodiment of the present invention, a mobile communication network (i.e., a base station or control station in charge of controlling the mobile communication network, or a server of controlling the operation of the base station or control station), and a second electronic device, and FIG. 19 is a view illustrating a method of controlling the first electronic device, the mobile communication network, and the second electronic device according to the fourth embodiment of the present invention.

In the fourth embodiment of the present invention, as illustrated in FIG. 18, it is assumed that the above-described IA 182 operates in the first electronic device 200, and the first electronic device 200 communicates with the second electronic device 300 through the mobile communication network 400. At this time, the above-described IA 182 may operate in the second electronic device 300 or may remain non-operating.

Referring to FIG. 19, the first electronic device 200 and the mobile communication network 400 may share the latest information on the call receiving mode which is set in the first electronic device 200 (S400). For example, whenever the status of the call receiving mode set in the first electronic device 200 changes, the first electronic device 200 may notify the mobile communication network 400 of the currently set receiving mode. As another example, the first electronic device 200 may periodically transmit the information on the call receiving mode set in the first electronic device 200 to the mobile communication network. As still another example, the mobile communication network 400 may periodically and/or non-periodically sends a request for the information on the call receiving mode currently set in the first electronic device 200 to the first electronic device 200. In response to the request of the mobile communication network 400, the first electronic device 200 may transmit the information on the currently set call receiving mode to the mobile communication network 400.

At this time, in the case that the second electronic device 300 sends a request for a call to the first electronic device 200 to the mobile communication network 400 (S401), the mobile communication network 400 may transmit the information on the call receiving mode for the first electronic device 200 to the second electronic device 300 rather than immediately sending the call request to the first electronic device 200 (S402). In particular, step S402 may be performed only when the call receiving mode set in the second electronic device 300 is the automatic mode. That is, in the case that the call receiving mode set in the first electronic device 200 is the normal mode, instead of performing step S402, the call request of the mobile communication network 400 may be immediately sent to the first electronic device 200.

Figure 20:
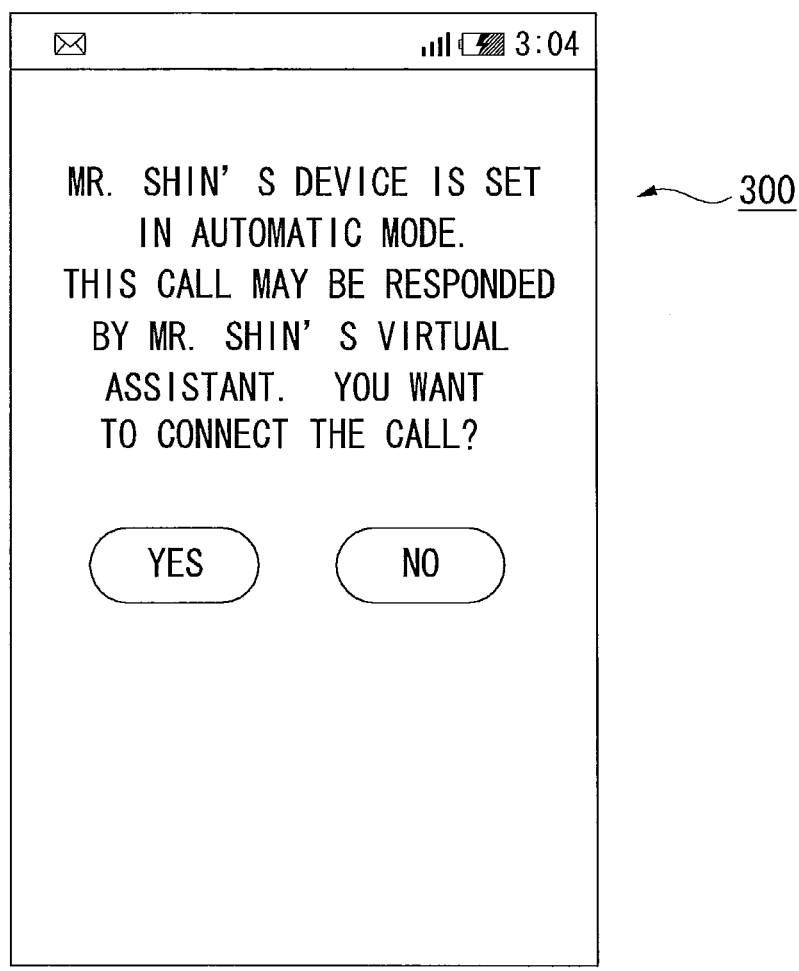
FIG. 20 is a view illustrating an example where information on the call receiving mode is output by the second electronic device according to the fourth embodiment of the present invention.

When receiving information on the call receiving mode of the first electronic device, the second electronic device 300 may output the received information on the call receiving mode through an output module provided in the second electronic device 300. Further, the second electronic device 300 may output a user interface through which it is inquired whether the user keeps maintaining the call requested in step S401 and the user's input may be received in response. FIG. 20 is a view illustrating an example where information on the call receiving mode is output by the second electronic device according to the fourth embodiment of the present invention. Referring to FIG. 20, it can be seen that the second electronic device 300 outputs an image indicating that the call receiving mode of the electronic device (i.e., the first electronic device 200) of the calling party (i.e., Mr. Shin) to which the call connection is intended is set in the normal mode, and thus, instead of the calling party directly taking the call, the virtual assistant (i.e., the IA 182) operating in the first electronic device 200 may respond to the call. In addition, an image inquiring whether to desire to maintain the call request although it is impossible to directly talk to the calling party to which the call was originally intended is output together with an image through which a response to the inquiry may be received.

Subsequently, the second electronic device 300 may determine whether to maintain the call request according to the user's input (S404). In the case that it is determined in step S404 that cancelling the call request is requested, the second electronic device 300 may send a request for cancelling the call requested in step S401 to the mobile communication network 400 (S405). On the contrary, in the case that it is determined in step S404 that maintaining the call request is requested, the second electronic device 300 may send a request for maintaining the call request to the mobile communication network 400 (S406).

Accordingly, when receiving the request for cancelling the call request, the mobile communication network 400 may terminate the process without transferring the call request to the first electronic device 200, but when receiving the request for maintaining the call request, the mobile communication network 400 may transfer the call request to the first electronic device 200 (S407).

Accordingly, the first electronic device 200 may receive the call request made from the second electronic device 300 and according to the above-described embodiments, the IA 182 provided in the first electronic device 200 may connect the received call on its own (S408), and further the IA 182 may perform the above-described automatic conversation with the user of the second electronic device 300.

By previously receiving information on the call receiving mode set in the first electronic device 200, the user of the second electronic device 300, who desires to directly talk to the user of the first electronic device 200 but not with the virtual assistant (i.e., IA 182) provided in the first electronic device 200, in the case that the first electronic device 200 is set in the automatic mode, may cancel the call request for the first electronic device 200 in advance. Accordingly, the user of the first electronic device 200 may have an additional effect of saving communication fees that may be inevitably incurred through the call connection to the first electronic device 200.

Meanwhile, in the case that cancelling the call request is requested in step S405, the mobile communication network 400 may generate an alert message indicating that there was the call request from the second electronic device 300 but the call request was cancelled later, and in the case that the mobile communication network 400 is later notified that the call receiving mode of the first electronic device 200 switched to the normal mode, the mobile communication network 400 may send the generated alert message to the first electronic device 200. Accordingly, the user of the first electronic device 200 may receive the information on the fact that the user of the second electronic device 300 attempted to make a call.

Hereinafter, a fifth embodiment of the present invention is described.

Figure 21:
FIG. 21 is a view schematically illustrating an operational environment of a first electronic device, a mobile communication network (i.e., a base station or a control station in charge of the mobile communication network), and a second electronic device according to the fifth embodiment of the present invention.

FIG. 21 is a view schematically illustrating an operational environment of a first electronic device, a mobile communication network (i.e., a base station or a control station in charge of the mobile communication network), and a second electronic device according to the fifth embodiment of the present invention, and FIG. 22 is a view illustrating a method of controlling the first electronic device, the mobile communication network, and the second electronic device according to the fifth embodiment of the present invention.

In the fifth embodiment of the present invention, as illustrated in FIG. 21, it is assumed that the above-described IA 182 operates in the mobile communication network 400, and the first electronic device 200 and the second electronic device 300 communicate with each other through the mobile communication network 400. At this time, it is assumed that the above-described IA 182 does not operate in the first electronic device 200 or the second electronic device 300. However, the fifth embodiment of the present invention may also apply to examples where the above-described IA 182 is included in the first electronic device 200 and the second electronic device 300.

At this time, the IA 182 provided in the mobile communication network 400 may perform an automatic conversation and/or automatic message conversation in a similar way to that of the IA 182 provided in the electronic device 100.

Referring to FIG. 22, the first electronic device 200 may send a request to the mobile communication network 400 so that the mobile communication network 400 responds to the call request instead of the user. That is, the first electronic device 200 may request that the IA 182 provided in the mobile communication network 400 respond to the call requested from another electronic device. Accordingly, the mobile communication network 400 may, as necessary, terminate a call for requesting a connection to the first electronic device 200 or directly receive the call to perform an automatic conversation rather than transferring the call to the first electronic device 200.

At this time, in the case that as illustrated in FIG. 22, the second electronic device 300 sends a request for the call to the first electronic device 200 (S501), the second electronic device 300 and the mobile communication network 400 may perform steps S502, S503, S504, S505, and S506. Steps S502 to S506 are the same or similar to steps S402 to S406 described in connection with the fourth embodiment, and thus further detailed description will be skipped.

Accordingly, when receiving a request for cancelling the call request, the mobile communication network 400 may terminate the process, but when receiving a request for maintaining the call request, the mobile communication network 400 may connect the call request instead of the first electronic device 200 (S507). At this time, the call request of the second electronic device 300 may not be transferred to the first electronic device 200.

Subsequently, the IA 182 provided in the mobile communication network 400 may perform an automatic conversation with the user of the second electronic device 300 instead of the user of the first electronic device 200 (S508). The IA 182 provided in the mobile communication network 400 may perform the automatic conversation with the user of the second electronic device 300 according to the above-described embodiments.

Then, if an call termination event occurs, the call connected between the mobile communication network 400 and the second electronic device 300 may be terminated (S509), and at this time, the IA 182 may create a transmission message and/or message history according to the above-described embodiments.

Subsequently, the created transmission message and/or message history may be transferred to the first electronic device 200 (S510). The transmission message and/or message history may be transferred to the first electronic device 200 after the connected call is terminated or after receiving a request for cancelling the automatic response from the first electronic device 200.

Accordingly, the user of the first electronic device 200 may have the same effects as if the IA 182 is installed in the first electronic device 200 even when the IA 182 is not provided in the first electronic device 200.

In the methods of controlling an electronic device according to the present invention, the steps constituting each embodiment are not necessary, and each embodiment may selectively include the steps. The steps constituting each embodiment do not need to be performed in the described order, and a later-described step may be performed earlier than an earlier-described step. Further, the method of controlling an electronic device according to the present invention may be implemented in the form of codes or programs of performing the methods, and the codes or programs may be stored in a computer readable recording medium.

A number of modifications, alternations, or variations may be made to the present invention by those skilled in the art without departing from the technical spirit of the present invention and the present invention is not limited to the above-described embodiments and the accompanying drawings. Further, all or some of the embodiments may be selectively combined to make various modifications. Still further, the steps in an embodiment may be performed alone or in combination with the steps in another embodiment.

What is claimed is:

1. An electronic device comprising:
a communication unit;
an output unit; and
a controller configured to:
connect a call received through the communication unit without a user's interaction,
perform an automatic conversation operation to conduct an automatic conversation with a calling party, wherein the automatic conversation operation includes recognizing the calling party's voice received through the communication unit, generating a response voice corresponding to a result of the recognition, and transmitting the response voice through the communication unit, wherein the response voice comprises an appropriate sentence or phrase for the calling party's sentence or phrase received via the connected call,
determine whether the calling party is urgent based on the automatic conversation;
selectively perform one of a first operation for providing the automatic conversation with the calling party to the user after the call is terminated or a second operation that allows the user to directly respond to the connected call when the calling party is urgent,
wherein the controller determines whether the calling party is urgent based on a result of natural-language processing the automatic conversation, or at least one of a tone, magnitude, and speed of the calling party's voice.

2. The electronic device of claim 1, wherein the controller verifies a set call receiving mode, when the verified call receiving mode is a normal mode, performs a call alert operation to output at least one of a call receiving alert image and a call receiving alert sound, and when the verified call receiving mode is an automatic mode, performs the automatic conversation operation.

3. The electronic device of claim 1, wherein the second operation further comprises generating recognition information on the automatic conversation and outputting the recognition information based on the automatic conversation, and
wherein the controller further receives a first user input on the output recognition information and transmits voice data corresponding to the first user input through the communication unit.

4. The electronic device of claim 1, wherein the controller activates at least one of modules for the call, including a speaker, a microphone, and a camera, when a second user input is entered with respect to the output recognition information.

5. The electronic device of claim 1, wherein the first operation further includes generating a transmission message of the calling party which is generated based on the automatic conversation.

6. The electronic device of claim 5, wherein the controller outputs the transmission message through the output unit when the call receiving mode switches from the automatic mode to the normal mode.

7. The electronic device of claim 1, wherein the controller determines whether at least one of a predetermined word and a phrase is included in the calling party's conversation.

8. An electronic device comprising:
an input unit;
a communication unit;
an output unit; and
a controller configured to:
set a call receiving mode including at least an automatic mode and a normal mode according to at least one of predetermined inputs received through the input unit and a predetermined criterion, transmit information on the set call receiving mode to a first electronic device through the communication unit, and perform an automatic conversation operation to conduct an automatic conversation with a calling party of a call received through the communication unit, wherein the automatic conversation is selectively performed according to the set call receiving mode, wherein the automatic conversation operation includes recognizing the calling party's voice received through the communication unit, generating a response voice corresponding to a result of the recognition, and transmitting the response voice through the communication unit, wherein the response voice comprise an appropriate sentence or phrase for the calling party's sentence or phrase received via the connected call, wherein the controller determines whether the calling party is urgent based on the automatic conversation, and performs a second operation that allows the user to directly respond to the connected call when the calling party is urgent, and wherein the controller determines whether the calling party is urgent based on a result of natural-language processing the automatic conversation, or at least one of a tone, magnitude, and speed of the calling party's voice.

9. The electronic device of claim 8, wherein the controller selectively performs one of a first operation for providing the automatic conversation with the calling party to the user after the call is terminated or the second operation, and wherein the second operation comprises generating recognition based on the automatic conversation.

10. The electronic device of claim 8, wherein the call is requested from a second electronic device through the first electronic device, and wherein the first electronic device provides the information on the set call receiving mode to the second electronic device when receiving a request of the call from the second electronic device.

11. The electronic device of claim 10, wherein when receiving a request of cancelling the call requested by the second electronic device, the first electronic device does not transmit the call to the electronic device.

12. The electronic device of claim 11, wherein the controller receives an alert message including information on the call cancelling from the first electronic device.

13. The electronic device of claim 12, wherein the controller receives the alert message when the call receiving mode switches to a normal mode.

* * * * *